(12) United States Patent
Jonas et al.

(10) Patent No.: US 10,680,840 B2
(45) Date of Patent: Jun. 9, 2020

(54) SYSTEM FOR INTEGRATING MULTIPLE IM NETWORKS AND SOCIAL NETWORKING WEBSITES

(76) Inventors: Lawrence A. Jonas, Beverly Hills, CA (US); Farshad Toobi, Beverly Hills, CA (US)

(*) Notice: Subject to any disclaimer, the term of this patent is extended or adjusted under 35 U.S.C. 154(b) by 212 days.

(21) Appl. No.: 12/549,597

(22) Filed: Aug. 28, 2009

(65) Prior Publication Data
US 2010/0199340 A1 Aug. 5, 2010

Related U.S. Application Data

(60) Provisional application No. 61/092,542, filed on Aug. 28, 2008.

(51) Int. Cl.
| | | |
|---|---|---|
| *H04L 12/18* | (2006.01) | |
| *G06Q 10/10* | (2012.01) | |
| *H04L 12/58* | (2006.01) | |
| *H04L 29/08* | (2006.01) | |

(52) U.S. Cl.
CPC ......... *H04L 12/1822* (2013.01); *G06Q 10/10* (2013.01); *H04L 51/04* (2013.01); *H04L 67/22* (2013.01)

(58) Field of Classification Search
CPC ...... G06Q 10/00; G06Q 10/10; G06Q 10/107; G06Q 50/00; G06Q 50/01; H04L 12/1813; H04L 12/1818; H04L 12/1822; H04L 12/1831; H04L 51/00; H04L 51/04; H04L 51/043; H04L 51/046; H04L 51/32; H04L 67/00; H04L 67/22; H04L 67/30; H04L 67/306; H04L 12/18; H04L 12/1827; H04L 67/24
See application file for complete search history.

(56) References Cited

U.S. PATENT DOCUMENTS

| | | | |
|---|---|---|---|
| 7,673,327 B1* | 3/2010 | Polis et al. ..................... 726/5 |
| 8,019,875 B1* | 9/2011 | Nielsen ........................ 709/227 |
| 2001/0044826 A1* | 11/2001 | Ludwig ................ G06Q 10/10 |
| | | | 709/204 |
| 2003/0118192 A1* | 6/2003 | Sasaki ........................... 381/17 |
| 2004/0193684 A1* | 9/2004 | Ben-Yoseph ................ 709/204 |
| 2005/0114527 A1 | 5/2005 | Hankey et al. |
| 2005/0171799 A1 | 8/2005 | Hull et al. |
| 2005/0216550 A1* | 9/2005 | Paseman et al. ............ 709/202 |
| 2006/0041848 A1* | 2/2006 | Lira ............................. 715/805 |
| 2006/0129633 A1* | 6/2006 | Potluri et al. ................ 709/203 |

(Continued)

OTHER PUBLICATIONS

International Search Report and Written Opinion for PCT/US09/55329, dated Nov. 20, 2009; 8 pages.

*Primary Examiner* — Shanto Abedin
*Assistant Examiner* — Adrian Stoica
(74) *Attorney, Agent, or Firm* — Buchalter, a professional corp.; Kari L. Barnes

(57) ABSTRACT

Systems and methods are described herein that provide for the integration of instant messaging applications and social networking websites. In some embodiments, a user can chat with individuals or groups of individuals that are logged in to a variety of different instant messaging applications or social networking websites, of which the user is a member. Thus, the user is able to use a single application to chat with any contact appearing on any of the user's contact lists across multiple different IM or social networks.

20 Claims, 21 Drawing Sheets

(56) References Cited

U.S. PATENT DOCUMENTS

| | | |
|---|---|---|
| 2006/0167944 A1 | 7/2006 | Baker |
| 2007/0005804 A1 | 1/2007 | Rideout |
| 2007/0168447 A1* | 7/2007 | Chen .................... G06Q 10/107 709/207 |
| 2007/0291776 A1* | 12/2007 | Kenrick et al. ............... 370/401 |
| 2008/0016142 A1 | 1/2008 | Schneider |
| 2008/0019353 A1 | 1/2008 | Foote |
| 2008/0034040 A1* | 2/2008 | Wherry ................ G06Q 10/107 709/204 |
| 2008/0155615 A1 | 6/2008 | Craner et al. |
| 2008/0172391 A1* | 7/2008 | Adelman et al. .................. 707/9 |
| 2008/0273476 A1* | 11/2008 | Cohen et al. ................. 370/260 |

* cited by examiner

SYSTEM FOR INTEGRATING MULTIPLE IM NETWORKS AND SOCIAL NETWORKING WEBSITES

CROSS-REFERENCE TO RELATED APPLICATIONS

This application claims priority to U.S. Provisional Patent Application Ser. No. 61/092,542, entitled "System For Integrating Multiple IM Networks And Social Networking Websites," filed Aug. 28, 2008, the disclosure of which is hereby incorporated by reference in its entirety.

BACKGROUND

The invention generally relates to Internet chat applications and social networking websites, and particularly to integrating the multitude of applications and websites available on the Internet into a single user chat experience.

Systems and methods are generally known for allowing an Internet user to communicate with other individuals via an online chat room. Software applications such as America Online's Instant Messenger (AIM), Microsoft Corp.'s MSN Messenger, Yahoo!, Inc.'s Yahoo! Messenger, and others allow users to communicate instantly with other users over a peer network. This type of communication, called instant messaging, allows simple, but limited access to a user's preferred contacts. Instant messaging applications permit users to track other users that are currently logged in and to send those users real time text messages. Users typically maintain a contact or buddy list of preferred contacts that are, for example, friends, family, co-workers, or others having common interests, etc. Users are able to participate in one-on-one chat sessions or in multi-user chat rooms.

In addition to instant messaging applications, social networking websites have increased in popularity in recent years. Websites such as Friendster, Facebook, and MySpace allow users to create personal, customizable web pages to leave messages, share photos, etc. Like instant messaging, social networking websites allow a user to maintain a list of preferred contacts. Unlike instant messaging, however, social networking is not typically used for instant communication. Instead, users maintain their list of contacts as a means to view the web pages of those contacts. Although these web pages are interactive and may contain their own chat applications, they are typically not used for real-time communication.

Current instant messaging applications and social networking websites are limited. One such limitation is the inability for the user of one application, such as AIM, to communicate with the user of another application, such as MSN Messenger. Another limitation is the inability for multiple users to chat using video and audio feeds. Video and audio chat, as opposed to text-based chat, is typically only available for one-on-one chat sessions. Users in a multi-user chat room are unable to use the audio and video functionality of instant messaging applications and are instead left with only text-based chat. Yet another limitation is the inability to communicate with individuals that are not logged into an instant messaging application or social networking website. Disclosed embodiments address these shortcomings in a single software application.

SUMMARY OF THE INVENTION

Systems and methods are described herein that provide for the integration of instant messaging applications and social networking websites. In some embodiments, a user can chat with individuals or groups of individuals that are logged in to a variety of different instant messaging applications or social networking websites, of which the user is a member. Thus, the user is able to use a single application to chat with any contact appearing on any of the user's preferred contact lists, across multiple different IM or social networks.

DETAILED DESCRIPTION

Figure 1:
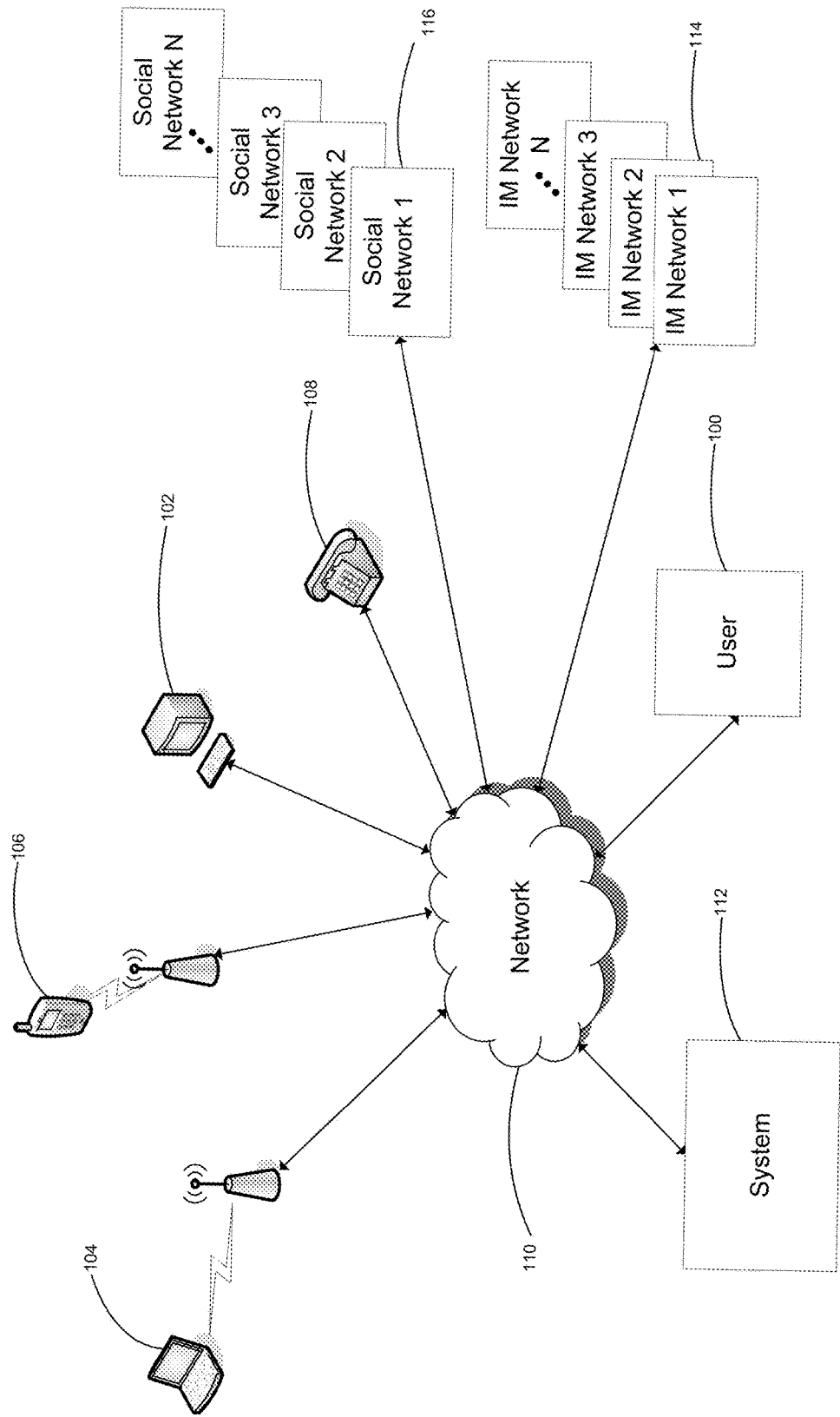
FIG. 1 is a block diagram illustrating a communication system and network.

The systems and methods provided herein allow for the integration of multiple instant messaging (IM) software applications and social networking websites. In some embodiments, a group chat room can be created to include all of a user's preferred contacts ("friends") from all social networks to which the user belongs. All users within that group chat room can communicate with one another via various communication methods such as, for example, text messaging, audio and video chat, short message service (SMS), and/or Voice Over Internet Protocol (VOIP or voice over IP). As a result, users are able to communicate with one another across various social networks.

In some embodiments, one-to-one chat (i.e. a private chat between only two users) can be available. One-to-one communication may have the same functionality as multi-user/group communication such as, for example, the ability to turn on a user's own audio and/or video feed, turn on the other user's audio and/or video feed with that user's permission, and/or send files to the other user.

In some embodiments, public chat rooms can be available for any user wanting to join. In some embodiments, private chat rooms can be available for invited users only. In some embodiments, users may automatically be joined to a chat room if the room contains friends of the user (i.e. semi-private). In some embodiments, private chat rooms can be subscription-based. Chat rooms, whether private, semi-private, or public, can include a limit on the number of people allowed to join.

In some embodiments, users in a multi-user chat room can use audio and/or video feeds to communicate with one another. That is, users in a multi-user chat room are not restricted to text-based messaging only, but can also communicate via audio, video, or both. In some embodiments, audio feeds to the chat room can be split and evenly distributed to all audio channels.

In some embodiments, a user is able to use a computer to place a telephone call (e.g., a Voice Over IP call) directly to another individual's phone via a chat room. For example, if the participants in a chat room want to communicate with another person that is not currently online within that chat room, one of those participants can dial the offline user's phone number to connect that user with the chat room. In such a case, the added participant (via the call) can chat with the other participants of the chat room. Conversely, an offline user can "dial-in" to a chat room and chat with the participants of that room. Other third party individuals can also be called and invited to join the chat room.

In some embodiments, a user is able to send a file to one or more users. In some embodiments, a user has its own whiteboard which it can share with any other user. The whiteboard can be used to open and share different types of files such as, for example, documents, spreadsheets, audio, video, pictures, etc. In some embodiments, a user's whiteboard can be seen by invitation only. In another embodiment, a user's whiteboard can be seen automatically by anyone in the chat room. In some embodiments, other users can draw on the whiteboard. In some embodiments, a user can post to their whiteboard, audio and/or video recorded using a cell phone.

In some embodiments, participants in a chat room can make a video playlist. The videos can be played back in a queued fashion wherein all users in the chat room can watch those videos. In some embodiments, a user can play games, individually or interactively with one or more other users.

In some embodiments, a user can set up greetings to be sent to himself or herself, a friend, or a group of friends. The greeting can be sent via various methods such as, for example, SMS, electronic mail, or an automated phone call. Additionally a user can customize greetings by, for example, setting or overlaying it with a tune, sending it out at a certain day and time, or embedding an advertisement. The user's message can also be selected from a prerecorded list or can use the user's voice.

As used herein the term "friend" can mean an immediate friend of a user or a mutual friend of a user. A "mutual friend" means similar to a friend of a friend. For example, if John is a friend of Mary (who is a subscriber/user of Yahoo Messenger) and also a friend of Jane (who is a subscriber/user of Facebook), and Mary is also a friend of Doug (who is a subscriber./user of MySpace), and Jane is also a friend of Jack (who is a subscriber/user of AIM), then Mary is a mutual friend of John and Doug and Jane is a mutual friend of Jack and John. The system of the present invention can allow security settings to be set to allow all these individuals/users of different networking systems to chat in a single chat room. This enables a larger group of people to participate in a chat room.

As used herein the terms "user" refers to a person who has an association with the integrated communication network. For example, a user can have credentials to allow the user to log-in and use the integrated communications network. A "user" can be connected to and "online" the integrated communication network or can be "offline" at a given time. For example, an offline user can be included in a list of friends of another user who is online at a given time. A "user" or a "participant" can each refer to a person that is online and participating in a chat room of the integrated communication network.

FIG. 1 is a block diagram illustrating a system for communicating over a communication network. A user 100 can connect to a network 110 such as the Internet, an intranet, a local area network, a satellite network, or other network. The user 100 can gain access to an integrated communication system 112, via, for example, a designated website address. The integrated communication system 112 can provide integrated communication between the user 100 and various other users (described below) across other IM networks 114 and/or social networks 116.

Once connected to the integrated communication system 112, the user 100 can communicate with other users 104, 106, and 108 over the network 110. For example, user 100 can connect to the network 110 using a computer, laptop, or other known electronic computing device and log in to the integrated communication system 112 as described in more detail below. The user 100 can communicate with other users also connected to the integrated communication system 112 via the network 110. For example, as shown in FIG. 1, a second user can be connected to the network via a computer terminal 102, a third user can be connected to the network via a laptop 104, a fourth user can be connected to the network 110 via a cell phone 106, and a fifth user can be connected via a standard land telephone 108. Thus, multiple users can be connected to the network 110 and the integrated communication system 112 using a variety of different types of electronic computing devices.

The integrated communication system 112 includes a computer or computers. As used herein, the term computer is intended to be broadly interpreted to include a variety of systems and devices including personal computers, laptop computers, mainframe computers, set top boxes, digital versatile disc (DVD) players, and the like. A computer can include for example, processors, memory components for storing data (e.g., read only memory (ROM) and/or random access memory (RAM), other storage devices, various input/output communication devices and/or modules for network interface capabilities, etc.

The integrated communication system 112 (also referred to herein as "system" or "communication system") can be based in software and/or hardware. The system 112 can provide for streaming of data in real-time. For example, an open source flash server can be used that can support, streaming of audio and video (e.g., FLV and MP3), recording client streams (e.g., FLV), shared objects, live streaming publishing and/or remoting (e.g., AMF). The system 112 can also include additional functionality, such as, for example, allowing users in a chat room to stream their video from a webcam to the server and the server can relay that to all users watching that video feed. In another example of added functionality, the system 112 allows for the users to be able to initiate audio conversations. For example, audio can be streamed to the server and the server can relay it to all users listening to that audio feed.

Various protocols for chat and also to communicate with the different IM networks (e.g., Yahoo, MSN, AOL, Google, ICQ, Skype, etc.) can be used. For example, the server can use Extensible Messaging and Presence Protocol (XMPP) protocols. XMPP is an open XML technology for presence and real-time communications. XMPP can also support integration with many IM networks. Additional features included with the system 112 can include, for example, automatic creation of chat rooms, automated room assignment to users based on the user's friends and single-sign on to multiple chat room, IM networks, and/or external websites. The system 112 can include various combinations of features and functionalities described herein.

Figure 2:
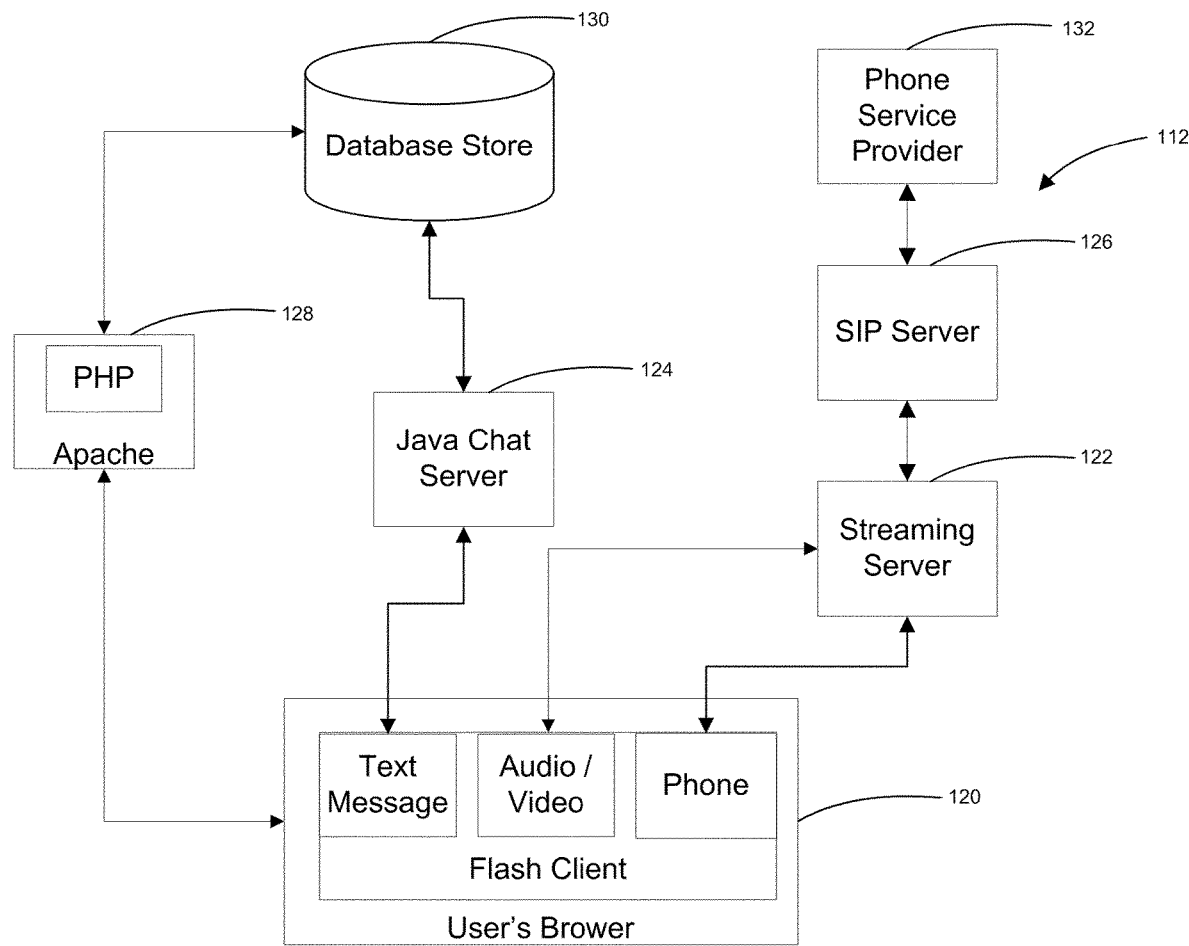
FIG. 2 is a schematic diagram illustrating the flow of information/data between a user and an integrated communication system according to an embodiment.
Figure 3:
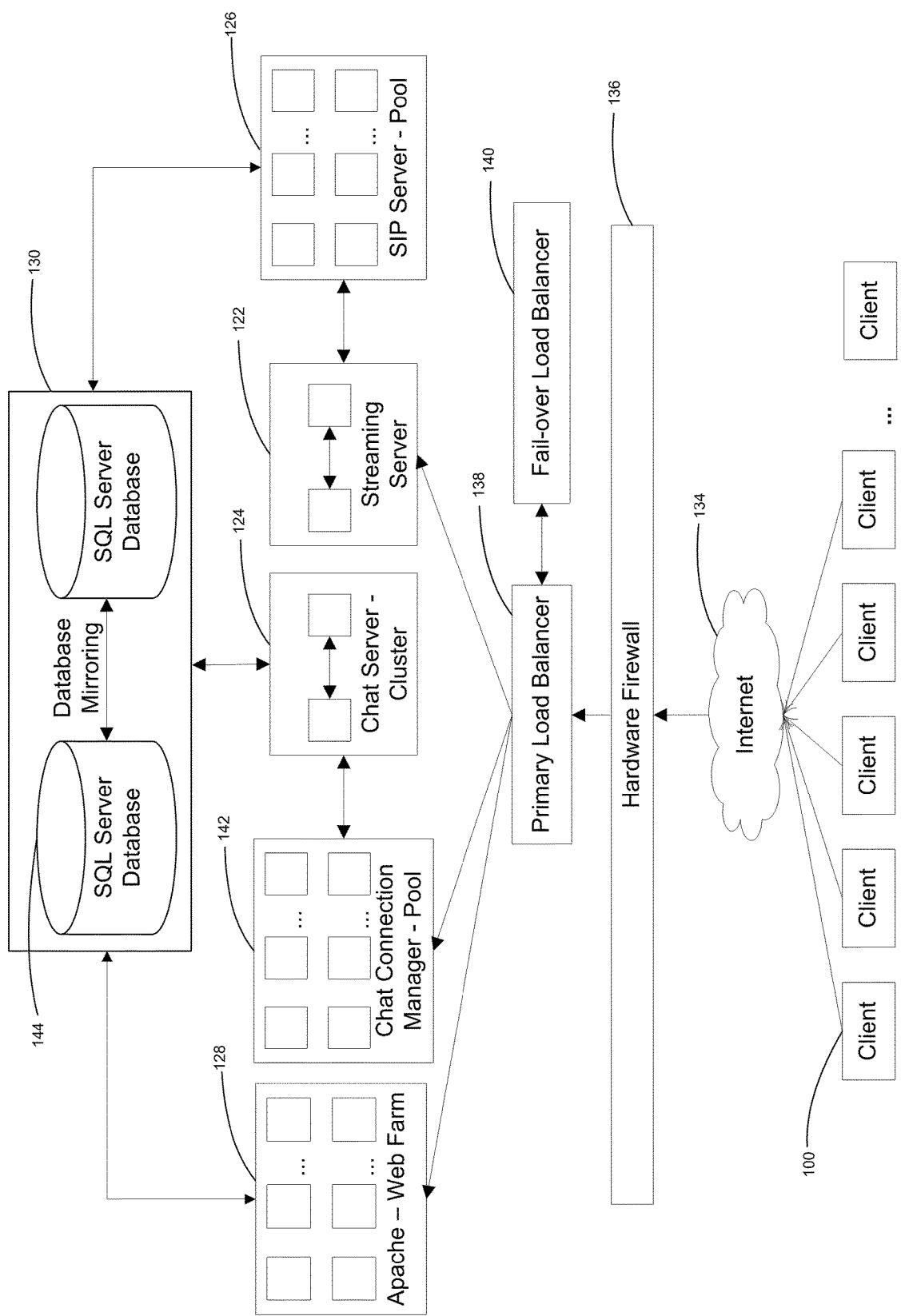
FIG. 3 is a schematic illustration of the system architecture of an embodiment of an integrated communication system.

FIGS. 2 and 3 are schematic illustrations of an example embodiment of an integrated communications system 112. FIG. 2 is a high level illustration of the interconnection between a user and the system 112 and the flow of information/data between the user and the various servers of the system 112. As described above, a user 100 can connect to the system 112 using, for example, a computer 120, including a browser and various connectivity and functionality capabilities, including, for example, the ability to send and receive text messages, audio/video capabilities and phone system connections (e.g., VOIP). The system 112 can include various servers, such as, for example, a streaming server 122, a chat server 124 and a SIP server 126 for communication with the user 100 (i.e., computer 120).

The system 112 can also include a module 128 (e.g., an Apache module) that can run, for example, a PHP (hypertext preprocessor) scripting language. The module 128 can be connected to a system database 130, which can include, for example, a Structured Query Language (SQL) server 144, as shown in FIG. 3. A phone service module 132 can also be included in the system 112 and in communication with the SIP server 126. The SIP server 126 is used in conjunction with the streaming server 122 and phone service module 132 to manage the video/audio and/or phone communications between users 100 (e.g., computer 120) and the system 112.

As shown in FIG. 3, multiple users or clients 100 (e.g., users 102, 104, 106, 108 shown in FIG. 1) can connect to the system 112 via a network such as the Internet 134. The system 112, can include a firewall 136, a primary load balancer 138, and a fail-over load balancer 140, as are well-known in the art. The primary load balancer 138 allows system 112 to obtain optimal resource utilization and system performance by distributing user 100 traffic between the various servers of system 112. Because the primary load balancer 138 is the single point of entry for a user to interact with system 112, the fail-over load balancer 140 can also be included. Fail-over load balancer 140 works in conjunction with primary load balancer 140—if primary load balancer 138 fails, fail-over load balancer 140 takes over and system 112 continues to operate without interruption. Also shown in FIG. 3 is a chat connection manager module 142 that routes information/data between the primary load balancer 138 and the chat server 124. Chat connection manager module 142 can also create and manage chat connections and settings to the various chat servers in chat server cluster 124.

Figure 4:
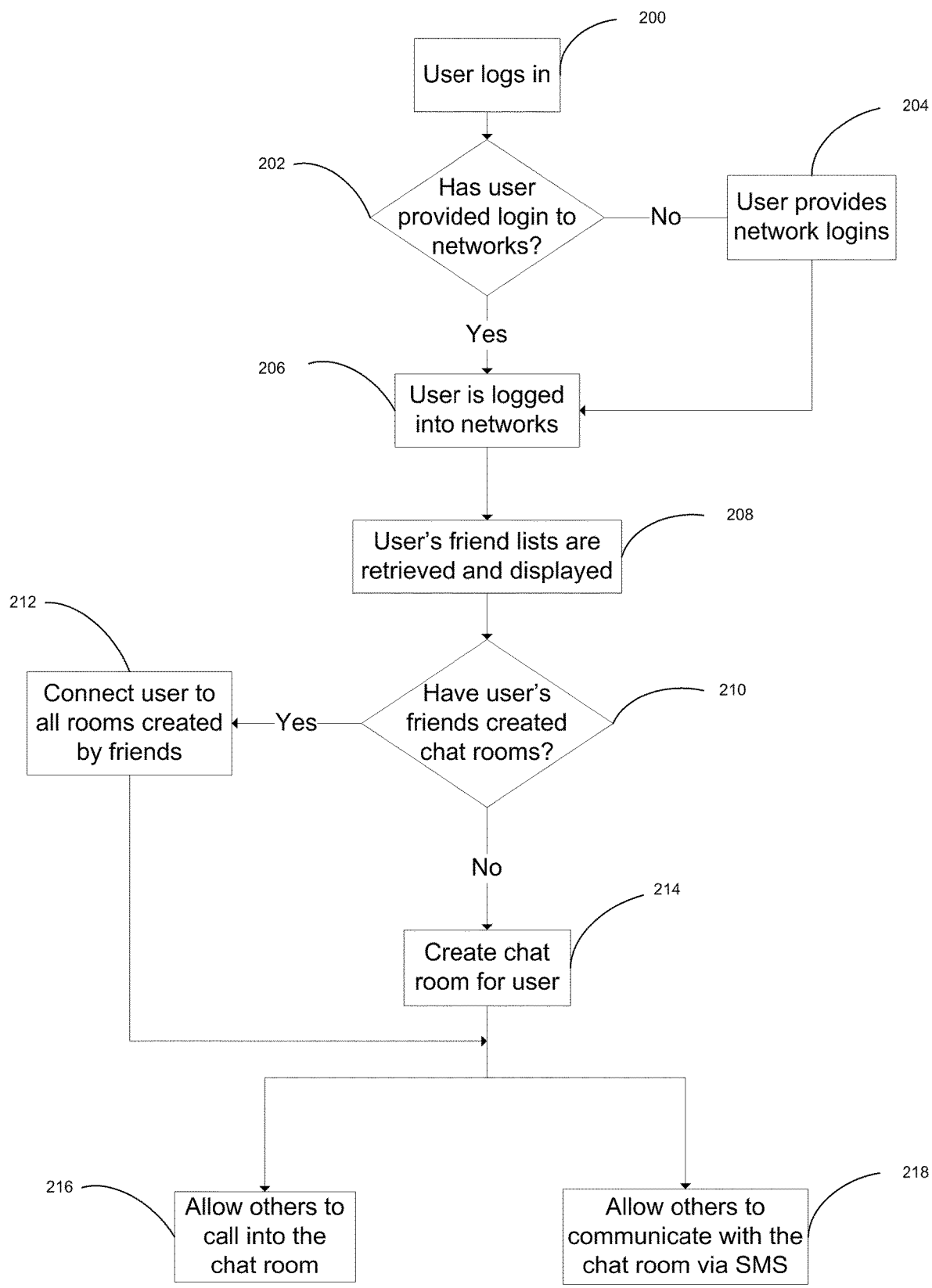
FIG. 4 is a flowchart illustrating a method of integrating instant messaging and social networking into a single chat application according to an embodiment of an integrated communication system.

FIG. 4 is a flowchart illustrating one embodiment of an integrated communication system 112 illustrating how a user creates chat rooms and joins other chat rooms created by other users, such as the user's friends. At 200, the user logs in to the system 112 with the user's log-in credentials that can include, for example, a user identification number and password for the integrated communication system 112 or a user identification and password associated with a particular IM or social network. After logging in, the user's credentials are checked at 202 to determine whether the user has registered its social networks with the system 112 (i.e. provided login information). If the user has not previously provided login information, at 204 the user provides that information. For example, the user may provide all of its user IDs and passwords for instant messaging networks such as, for example, AIM, MSN Messenger, Gtalk, ICQ and/or Yahoo! Messenger, as well as user IDs and passwords for social networking websites such as, for example, Facebook, MySpace, Hi5, and/or Orkut. Additionally, a user may store user IDs and passwords for other external websites such as, for example, online banking or electronic mail websites. The system 112 can store the user's user ID and password for the social networks and websites in an encrypted format. Whether the user has previously provided login information or provides it at 204, at 206 the system 112 will log the user in to all social networks (e.g., IM networks and/or social networking websites) for which it provided login information.

At 208, the system 112 retrieves and displays the user's pre-selected list of friends (also referred to as "buddies") from each social network for which the user provided login information. The user can sort the list of friends in various ways including, for example, by social network or by participant status (e.g. friend is online, offline, away). Additionally, the user may filter its friends list by, for example, showing only those friends from certain social networks or by showing only a selected number of social network friends. The system 112 then examines each list of friends or mutual friends at 210 and determines whether any of the user's friends have created a chat room. At 212, the system 112 allows the user to join each chat room created by the user's friends or mutual friends. For each chat room the user joins, a visual indicator may be created to aid the user in switching between chats. For example, when the user is added to a chat room, a tab for that chat room may be displayed on the user interface. The user is then able to switch between chat rooms and communicate with the participants of each chat by clicking on the desired chat room tab. When a tab for a particular chat room is clicked, that chat room becomes active.

Additionally, to keep track of multiple chat rooms, each chat room the user joins can be identified by, for example, the name of the user that created that particular chat room. At 214, after examining the user's list of friends, the system 112 can create a chat room for the user. For example, if it is determined that there are no existing chat rooms created by the user's friends (e.g., at 210), the system can create a new chat room at 214. The system 112 can also optionally create a new chat room even if it is determined that there are existing chat rooms created by friends. The newly created chat room can be named, for example, the same name as the user. Whenever a friend or mutual friend of the user signs onto a social network (e.g., IM networks and/or social networking websites) registered by the user, that friend will be able to join the user's chat room. As a result, there can possibly be a mix of friends and mutual friends from different IM and social network websites in a single chat room.

Figure 5:
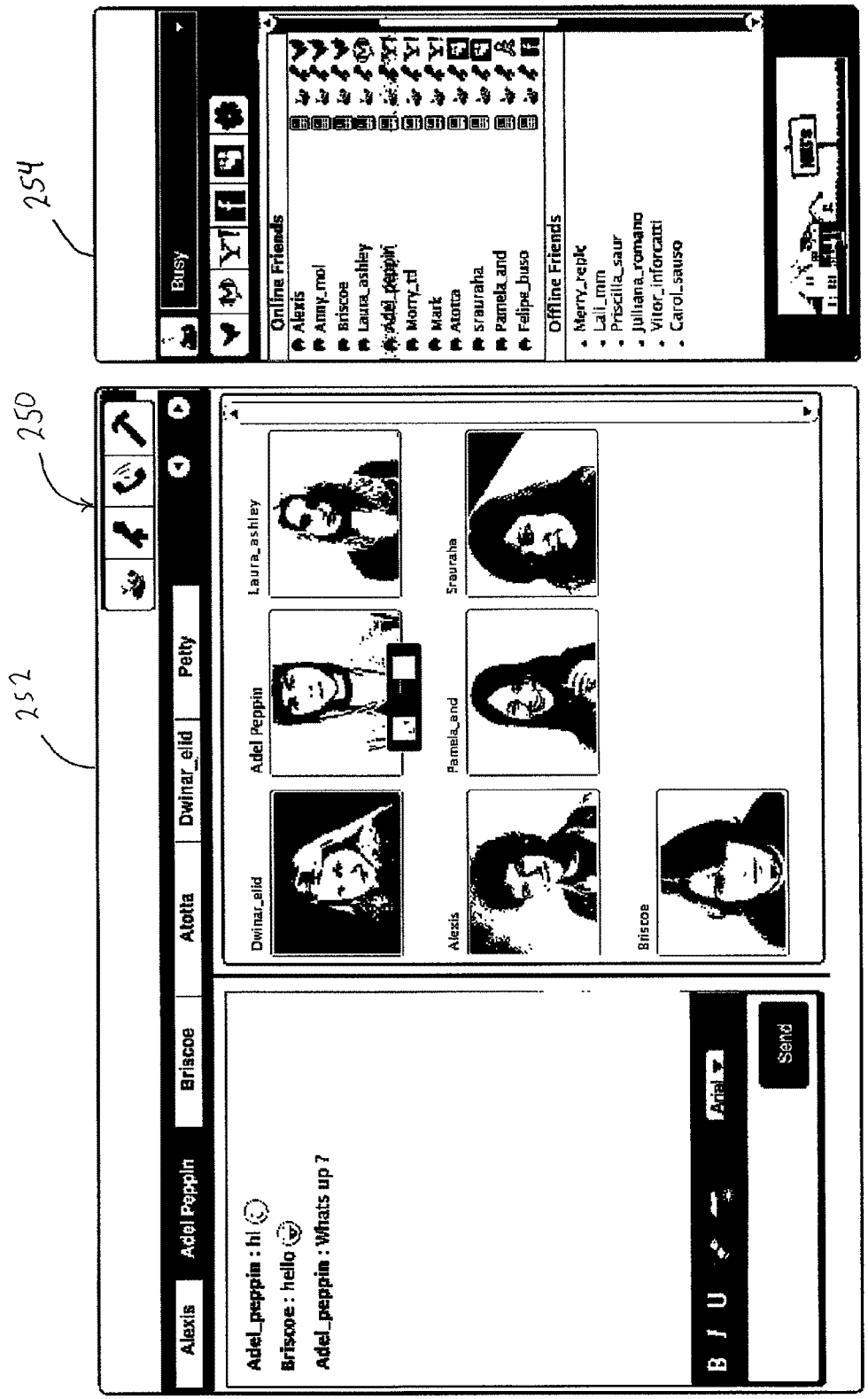
FIG. 5 is a screenshot illustrating an example user interface of an integrated communication system according to an embodiment.

FIG. 5 is a screenshot of an example user interface display 250, illustrating the integration of multiple participants from various different IM and social networks in a single chat room. As shown in FIG. 5, the interface display 250 can include multiple displays including a first display portion 252 showing video feeds of multiple users/participants of the chat session, and a second display portion 254 including a listing of the user's friends that are online and a listing of the user's friends that are offline. For the users that are online, the listing display can also indicate which IM or social network to which each friend is logged-in (e.g., Yahoo Messenger, Facebook, AIM, Google Gtalk, MSN Messenger MySpace, etc.). The system 112 can display multiple video feeds (e.g., of participants) in a single chat room. For example, two, three, four, five or more video feeds can be displayed. As shown in FIG. 5, seven video feeds are displayed in the first display portion 252. FIG. 5 is merely an example of (e.g., a screenshot at a given time period) of a user interface display, and it should be understood that various display features can be included (or excluded) on a user interface display.

In some embodiments, an individual that is not currently participating in the chat room can be invited to join the chat room via call. For example, at 216 (referring back to FIG. 4) a participant can place a call from within the chat room to the desired individual. This call can be made using, for example, Voice Over IP. For example, a phone handset icon visible on the participant's computer display can be actuated to initiate the call. If the called individual answers the phone call, then that person automatically becomes a participant in the chat room and is able to communicate with all other participants of the chat. For example, all chat room participants, including the individual on the phone, can communicate by speaking to one another.

In some embodiments, a user can define a phone number for himself or herself. The user can then give the phone number to friends or publish it in a directory. Additionally, a user can define a phone number for a particular friend. When calling a friend, a user can choose which phone number to use, the one defined by the user or the one defined by the friend.

In some embodiments, the participants can also communicate via text-based communication. When using text-based communication, in some embodiments, speech-to-text translation methods can be used to translate the voice of an individual on the phone to text. Conversely, text-to-speech translation methods can be used to translate text from chat room participants to speech for the person on the phone. In some embodiments, at 218, an individual participating in the chat room via a phone can communicate with other participants in the chat room via SMS. For example, a participant in the chat room can enter a text message in the chat room and the text message can be sent via SMS to the participant on the phone. The person to whom the SMS message is sent can be automatically connected to the chat room as a participant. If a user does not want to communicate via SMS text, however, that user can set a privacy setting that prevents the user from being automatically joined to a chat via SMS. Each message sent via SMS can contain information identifying the speaker such as, for example, a prefix indicating the speaker's username. The same is true when an IM network friend or mutual friend participates in a chat room. The IM friend/mutual friend will receive the messages of the chat room prefixed with the sender's username. Conversely, an individual participating in the chat room via a phone can send a text message via SMS that can be displayed in the chat room for viewing by all other participants in the chat room. In some embodiments, the individual sending the text message via phone can designate the message to be viewed by only some participants.

Thus, an integrated communication as described herein can be used to create chat rooms and allow users to join multiple chat rooms across multiple IM networks and social networking sites. The participants in such chat rooms can communicate using text, audio and video chat methods. Participants can also communicate using text messages and talk via VOIP phone calls. When communicating via audio and video, a user can have the ability to turn on its own audio and/or video feed. Additionally, users can have the ability to turn on any other user's video and audio feeds with the other user's permission. The audio can be set such that audio from all participants in a chat room will be audible for the active room only. If the user switches to a different room, the audio for the previous chat room will stop playing and audio from the currently active room will begin. The video can be set in a similar manner or, alternatively, the user can see video from all users in all chat rooms in which the user is currently participating.

Figure 6:
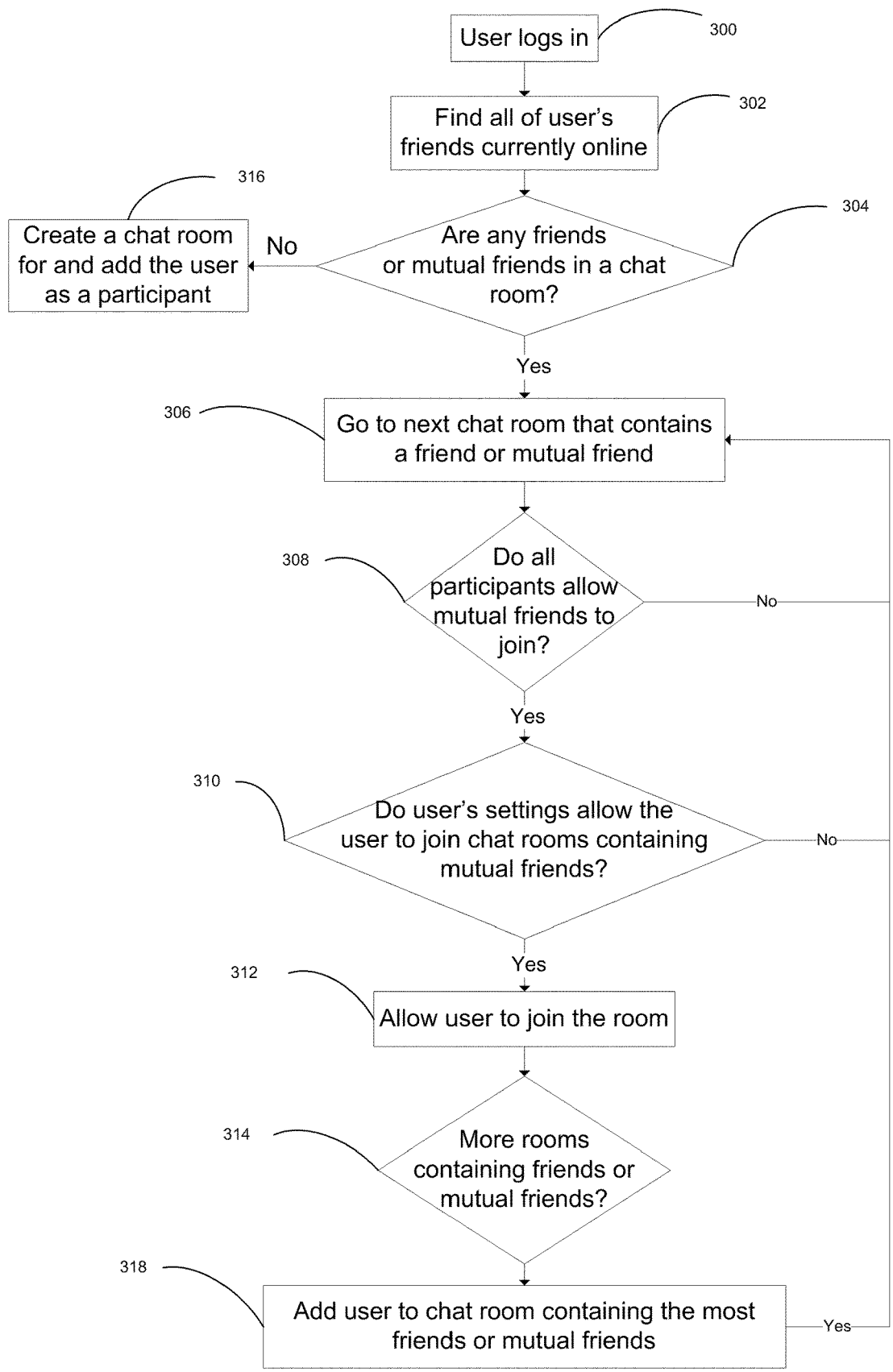
FIG. 6 is a flowchart illustrating a method of initiating a chat room including the use of security settings according to an embodiment of an integrated communication system.

As described above, the integrated communication system 112 can include a variety of different functionalities to enhance the communication capabilities of the system. It should be understood that some or all of the functionalities can be included in an integrated communication system 112 as described herein. Thus, the communication system 112 can have a variety of different configurations. FIG. 6 is a flowchart illustrating a method of checking for security settings implemented by participants using the system 112. As described above, a user of the integrated communication system 112 can join chat rooms in which a friend or buddy is a participant. A user can also join chat rooms that a mutual friend is a participant.

As shown in FIG. 6, a user can log in to the communication system 112 at 300 using any of its registered logins. For example, the user can log in to system 112 using its login for Facebook, MySpace, AIM, Yahoo! Messenger, or any other social network the user has registered with the system. After logging in, at 302, system 112 reviews/examines all of the user's friend lists from each of its registered networks to check which friends are currently online. If the user logs in to system 112 using, for example, its MySpace login, the system 112 will still cycle through all of the user's registered social networks such as, for example, Facebook, MySpace, AIM, Yahoo! Messenger, etc. At 304, system 112 checks whether any of the online friends or mutual friends of the user are participating in a chat room. If not, system 112 can create a chat room for the user at 316. As described above, system 112 can assign the chat room a name such as, for example, the login ID or name of the user. After the chat room has been created, other users can join in the chat room as described above with reference to FIG. 4.

Alternatively, if system 112 finds one or more friends or mutual friends of the user participating in one or more chat rooms, system 112 maintains a list of those chat rooms and cycles through (e.g., reviews/examines) each room beginning at 306. For each chat room on the list, the system checks for any security settings that have been placed on the chat room by a user at 308. For example, the system 112 can determine whether any participant has a security setting that denies access to, for example, mutual friends. If access is denied by at least one participant, system 112 goes back to 306 to check the next chat room on the list. If none of the participants has a security setting that denies access to the user, the user's security settings are checked at 310. For example, the system 112 checks the user's security settings to determine whether the user has defined a setting that prohibits system 112 from joining the user to a chat room with mutual friends. If the user's security settings contain a setting that prohibits adding the user to a chat room in which a mutual friend is participating, then the user is not added to that chat room and system 112 cycles back to 306 to check the next chat room on the list.

Alternatively, if the user does not define such a security setting, system 112 allows the user to join that chat room at 312. System 112 continues to cycle through this loop 306, 308, 310, and 312 until it reaches the end of chat room list (e.g., identified at 306). After cycling through each chat room on the list, at 314, the chat room that contains the greatest number of the user's friends is identified, and the user is placed in that chat room at 318. In other words, of all the chat rooms system 112 allows the user to join (at 312), the user is placed in the room that contains the highest number of friends.

Figure 7:
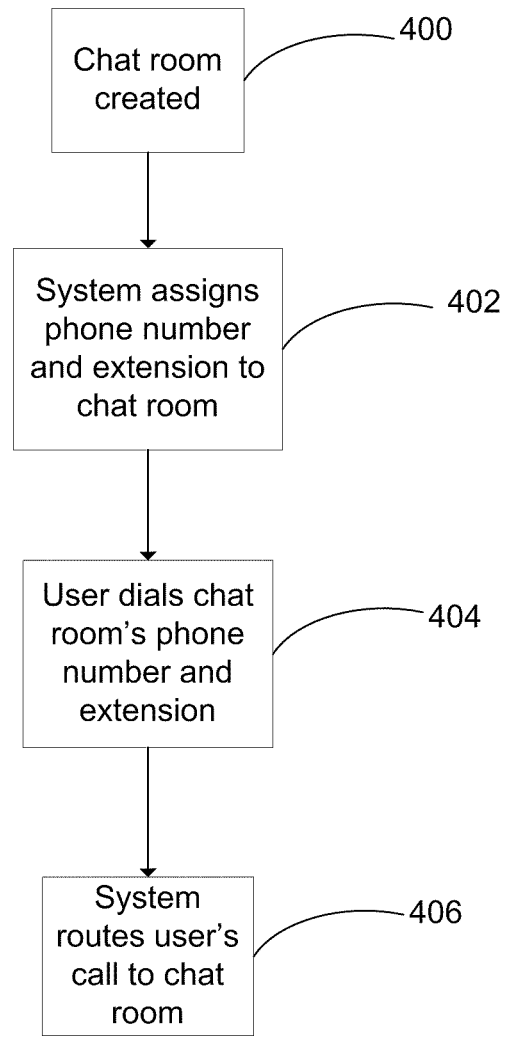
FIG. 7 is a flowchart illustrating a method of dialing-in to a chat room according to an embodiment of an integrated communication system.

As described above, in some embodiments, the integrated communication system can also provide for a user to join in a chat room via telephone. FIG. 7 is a flowchart illustrating a method of connecting to a chat room within the system 112, using a phone to call into and connect to the chat room. In this embodiment, at 400, an online user logs into the system 112 whereby the system 112 creates a chat room for that user as described above, for example, with reference to FIG. 4. At 402, the system 112 assigns a phone number and extension to the chat room. Participants in the chat room can SMS the phone number and extension to friends not currently participating in the chat room via the system 112. At 404, a person that desires to participate in the chat room, but is unable to log in to a social network (e.g., via a computer) can use the phone number and extension to call into the chat using a landline phone, cell phone, VOIP, or other telephony equipment. The system 112 answers the call at 406 and routes the caller to the appropriate chat room based on the extension entered. The caller will then be able to communicate with the participants of that chat room as described in FIG. 4 above.

In some embodiments, the integrated communication system 112 can also include the ability for a user within a chat room to call other users to join in the chat room. The system 112 can assign a telephone number for the chat room and optionally a pin code. Users in the chat room can send the phone number (and pin code if applicable) to his or her friends and those friends can then call into the chat room.

Figure 8:
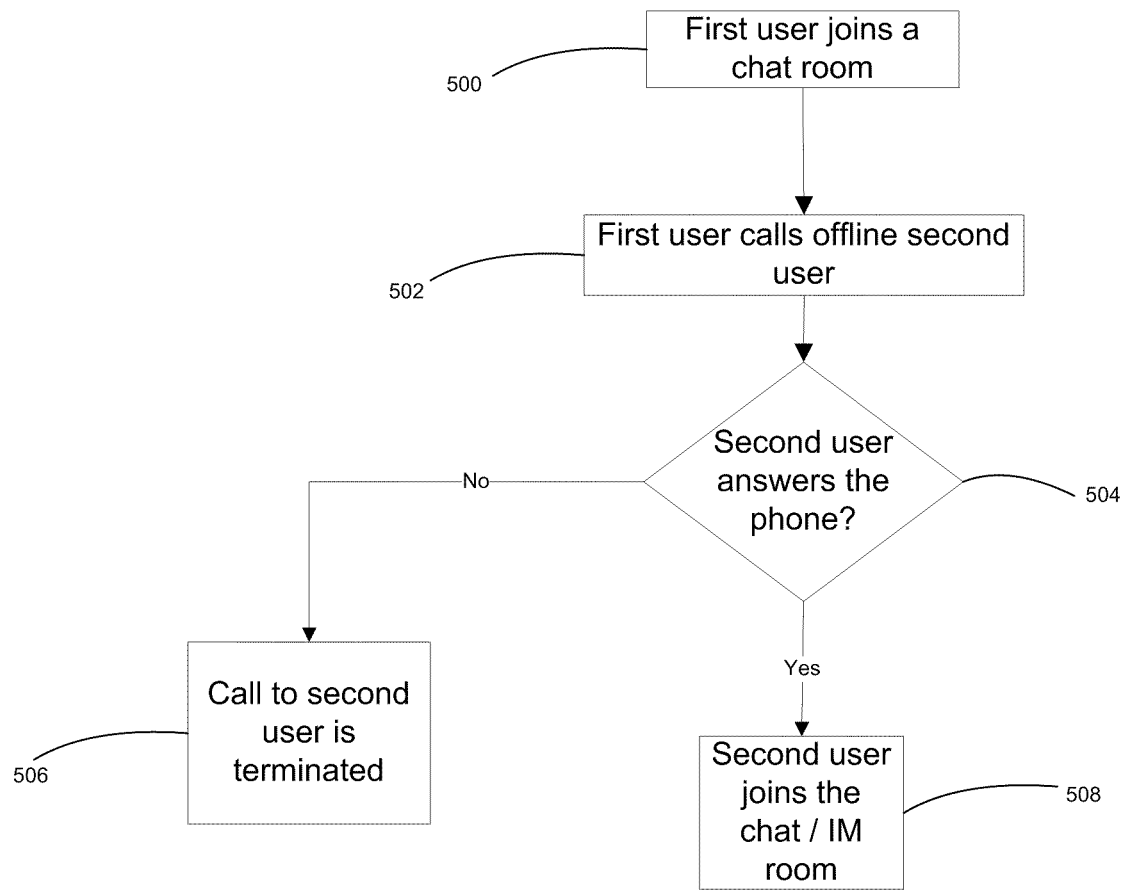
FIG. 8 is a flowchart illustrating a method of calling out from a chat room according to an embodiment of an integrated communication system.

For example, as shown in the flowchart of FIG. 8, a first user can join a chat room at 500 as described above. At 502, the first user can place a call to someone he would like to have join the chat room. For example, the first user can have a list of friends and their associated telephone number (e.g., a cell-phone, land line, or VOIP number) can be provided in the list. The first user can click a button on the screen next to or associated with a second user (e.g., a friend of the first user) who is currently offline (e.g., not participating in the chat room) and the system 112 will make a VOIP call to that person (e.g., the second user).

The first user can determine if the second user answers the call at 504, and if not, can terminate the call at 506. For example, the first user can press a disconnect button or click a disconnect icon on the screen. In some embodiments, at 504, the system 112 can make a determination as to whether the second user answers the call, for example, after a certain number of rings. If the second user does not answer the call, the system 112 can automatically terminate the call at 506. If the second user does answer the call, at 508, the second user joins the chat room. Once joined within the chat room, other participants (in addition to the first user) in that room can also hear and communicate with the second user.

Figure 9:
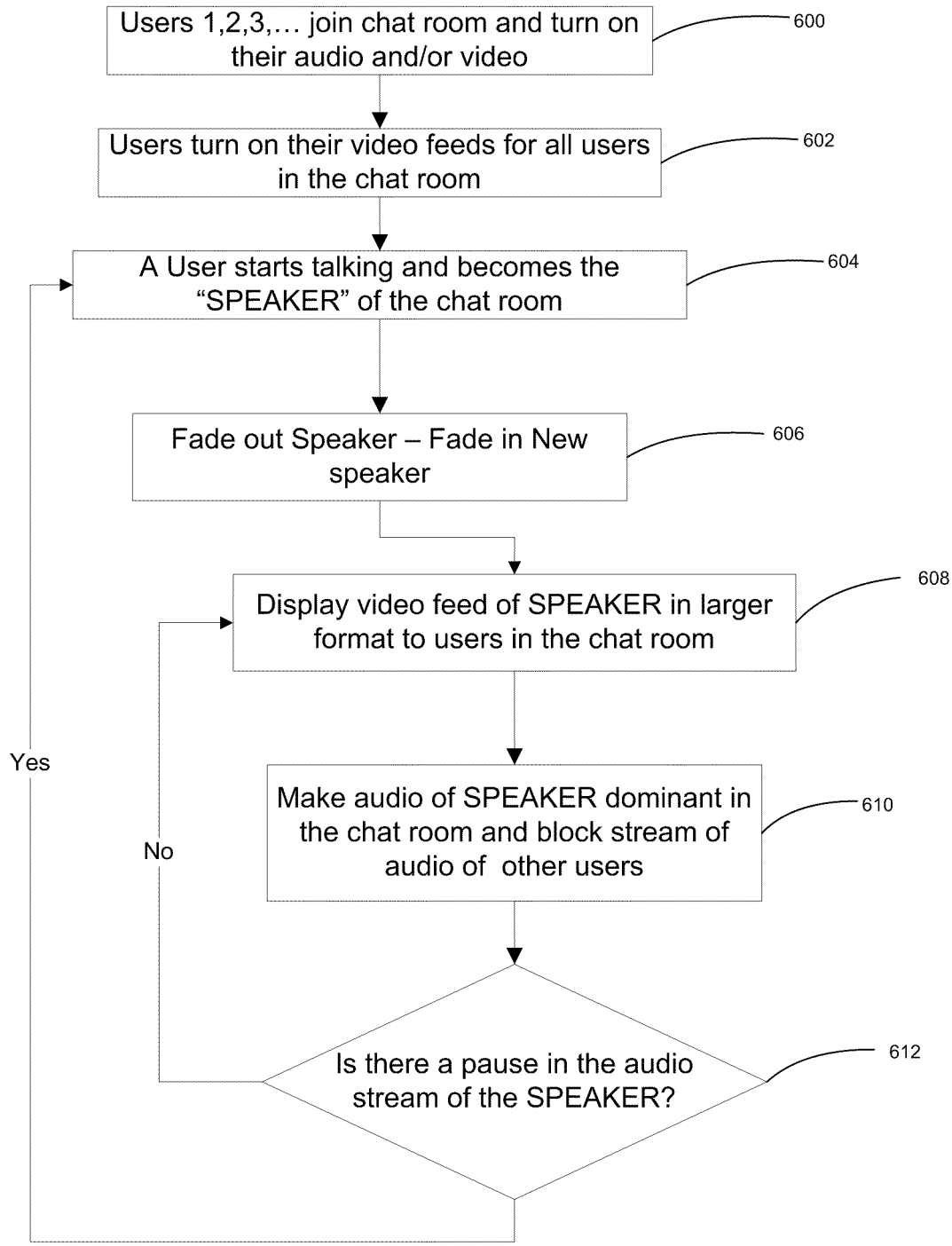
FIG. 9 is a flowchart illustrating a method of displaying a speaker within a chat room according to an embodiment of an integrated communication system.

The integrated communications system 112 can also include various features that can further enhance the chat room experience for the participants. In one example, the system 112 can include an enhanced visual effects feature that allows the particular speaker during a chat session to be viewed in a larger video screen space or format than the other participants. As shown in FIG. 9, at 600, a number of users/participants can join a chat room via the system 112 as described above, and turn on their audio and/or video. The first user in the chat room becomes the "Owner." Certain features relevant to the Owner are described in more detail below. At 602, the users can turn on their video feeds for all users in the chat room. When a user in the chat room begins to talk that user becomes the "Speaker" of the chat room at 604. Thus, the Speaker is the user that is currently talking during the chat session. The video feed of the Speaker will be produced on all users' video screens larger than the other users. The video feed associated with a given user may include, for example, a photograph, symbol, avatar, text, etc. selected by that user to represent himself/herself.

If the Speaker stops talking for a specified time period (e.g., n number of seconds), then the floor becomes open for someone else to become the Speaker. At that point, if a new Speaker begins talking, at 606, the system 112 will perform a visual effect of fading out the previous Speaker and fading in the new Speaker's video feed, which will be displayed in a larger format to all users in the chat room as indicated at 608. A variety of different special effects can be used and selected by each user, for example, during a user set-up procedure with the system 112.

At 610, in some embodiments, the system 112 can also make the audio feed of the Speaker dominant in the chat room. For example, the system 112 will prevent the stream of audio from other users if they start talking while the Speaker is talking. This can enable a meeting or chat session to take place without sudden interruptions. The system 112 can optionally be configured to allow the Owner to override this feature. In this case, the audio of the Owner will be streamed in regardless of who else is talking. The system 112 can also be configured to allow the Owner to change settings to allow the audio of all the users to be streamed at all times. At 612, the system 112 can determine if there is a pause in the audio stream of the Speaker. For example, if the audio feed for the Speaker ceases for a specified time period (e.g., n number of seconds) then the system 112 can fade out the Speaker. At that time, a new user can start talking and become the Speaker, at 604. If there is no pause in the audio feed of the Speaker, then the Speaker continues to be displayed in a larger video format than the other users, at 608.

Figure 10:
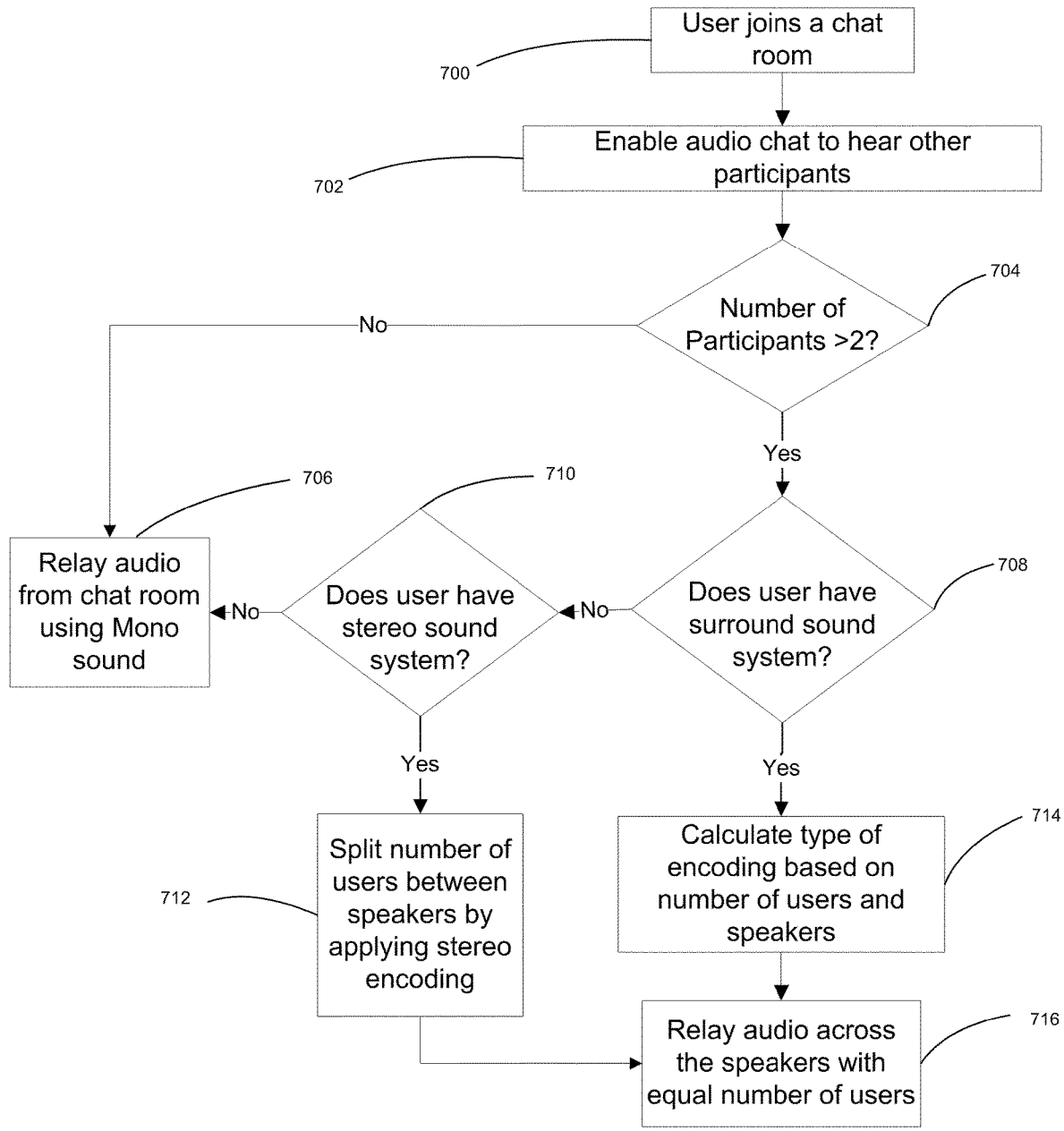
FIG. 10 is a flowchart illustrating a method of distributing audio between speakers according to an embodiment of an integrated communication system.

Another example of an enhanced feature of the system 112 is described with reference to FIG. 10. In this example, the system 112 includes an enhanced audio management feature that allows the participants to achieve a stereo or surround sound effect during a chat session. As shown in FIG. 10, at 700, a user can join a chat room as described above. At 702 the user enables an audio chat to hear other users in the chat room. The system 112 can make a determination at 704 as to how many users are participating in the chat room. If the number of other participants is less than 2, then the system 112 can relay the audio or voice from the chat room in mono sound to the user at 706. If, at 704, the number of other participants is determined to be greater than 2, then the system 112 can then determine if the user has a surround sound system at 708. If the user does not have a surround sound system, then the system 112 can determine if the user has a stereo sound system at 710. If the user does not have a stereo sound system, then the system 112 can relay the audio or voices from the chat room in mono sound at 706. If the system 112 determines at 710 that the user does have a stereo system, then the system 112 can encode the sound by splitting the number of participants between two speakers (or however many speakers the user has) by applying stereo encoding at 712. At 716, the system 112 can relay or distribute the audio across the two speakers with an equal number of participants.

If, at 708, it is determined that the user does have a surround sound system, then the system 112 can calculate the type of encoding needed based on the number of participants and the number of speakers the user has at 714. At 716, the system 112 can relay or distribute the audio by encoding the sound across the speakers with an equal number of participants.

Figure 11:
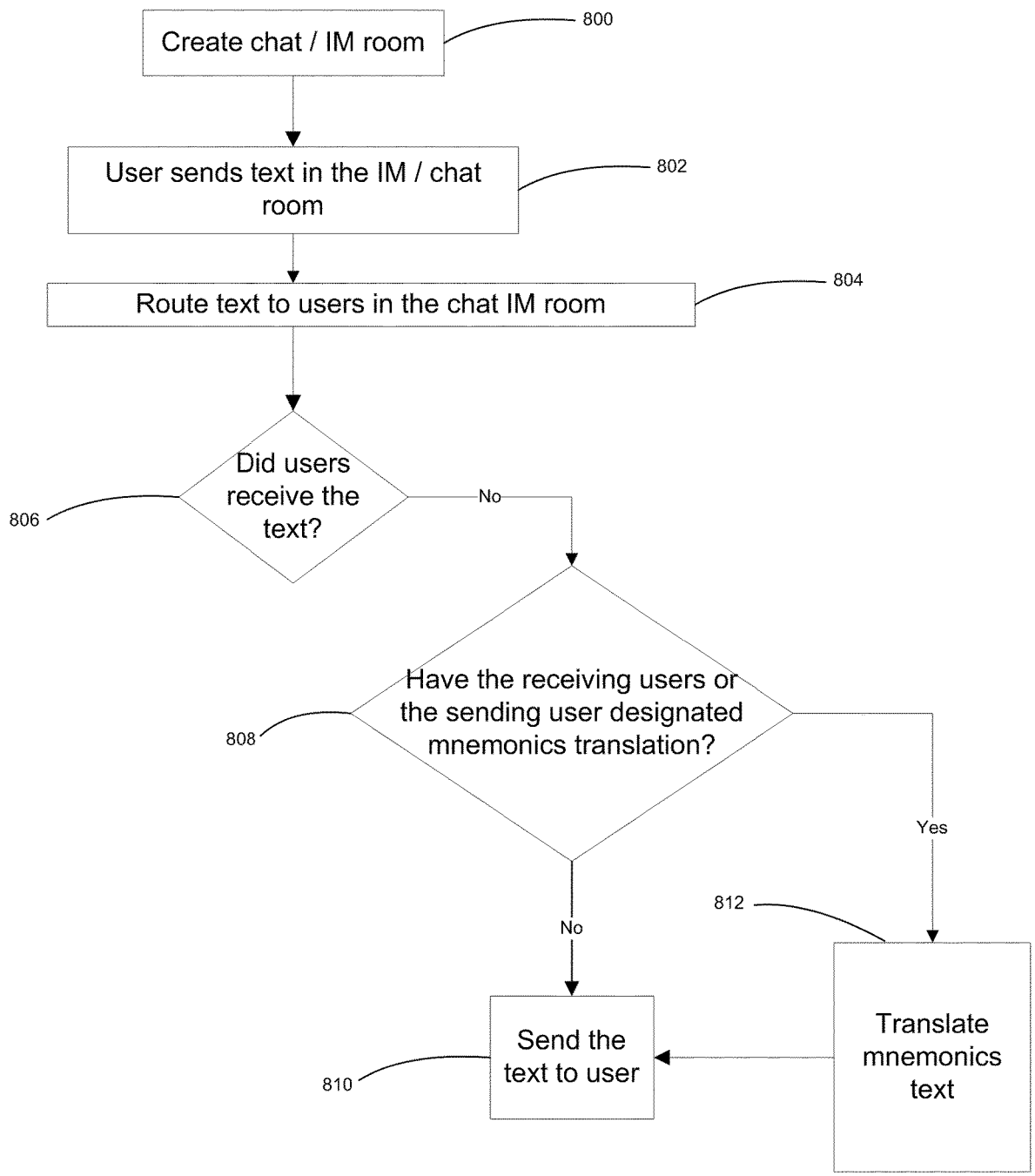
FIGS. 11 and 12 are each a flowchart illustrating a different method of providing a translation function according to embodiments of an integrated communication system.
Figure 12:
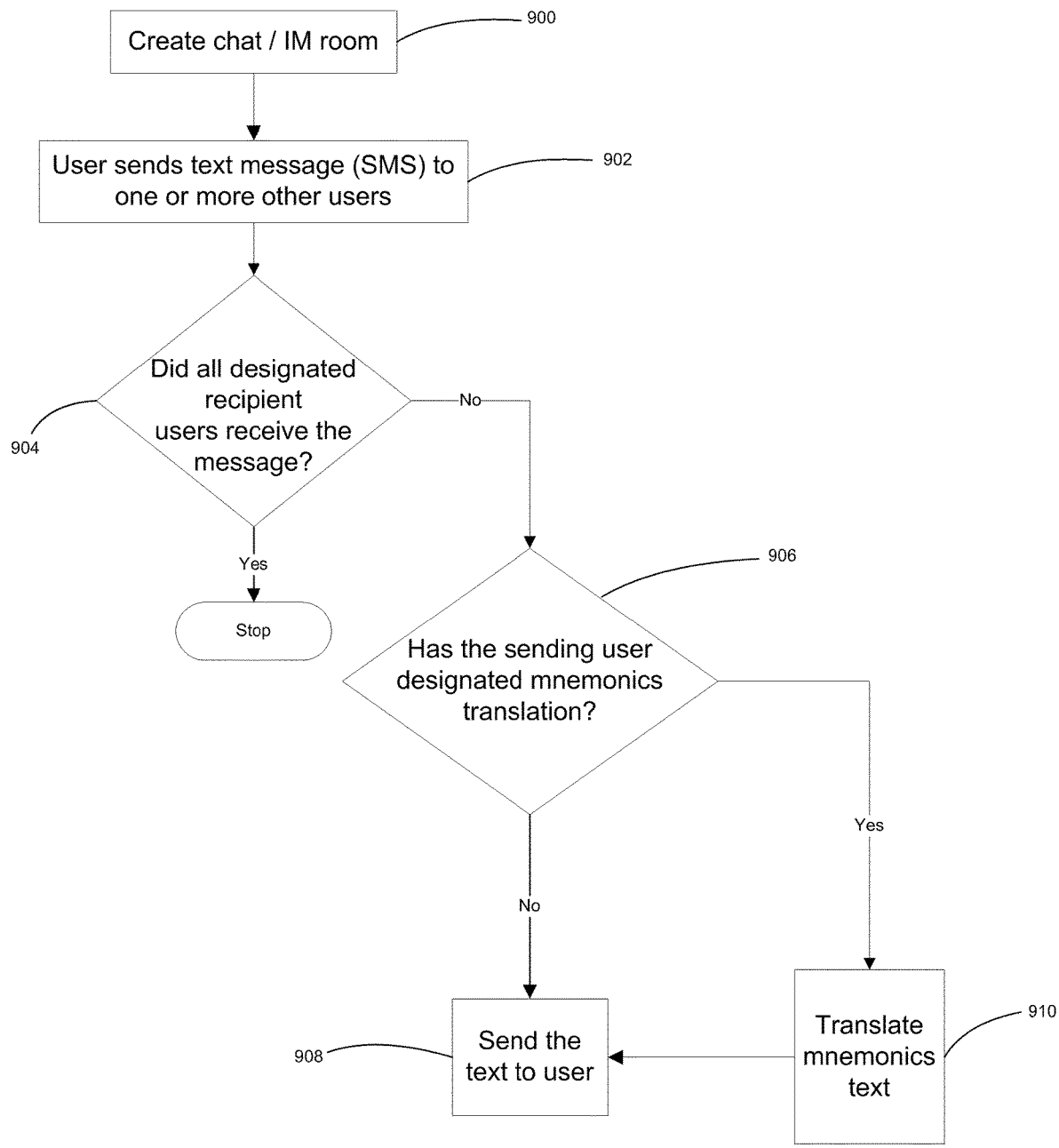

FIGS. 11 and 12 illustrate translation capabilities of the system 112. In some embodiments, the system 112 can be configured to translate text that a user sends to other users in a chat or IM room. For example, a receiving user can select such translation as a set-up option of the system 112. Similarly, a sending user, can also indicate whether the user wants messages that he or she sends out to be translated. If translation is selected, the system 112 can parse each word in the text, and match it against the system's translation database. The word can be translated to a new value in that database. This can enable users that are not familiar with shorthand mnemonics to understand what the other parties are conversing about. For example, if a user types "LOL," the system 112 can translate this to "laughing out loud."

FIG. 11 is a flowchart illustrating the use of such a translation feature within the system 112 for translation of text sent via a chat or IM room through a website. FIG. 12 illustrates the use of the translation feature of the system 112 to translate text messages sent via SMS. As shown in FIG. 11. at 800, a chat or IM room is created as described above. A first user types a text message in the IM/chat room and sends the text message to one or more other users at 802. At 804, the system 112 will route the text to the designated user or users in the IM/chat room. At 806, the system 112 can make a determination whether all the users designated to receive the text did in fact receive it. If all designated recipients did receive the text, no further action by the system 112 is performed. If one or more designated recipients did not receive the text, at 808 the system 112 checks the receiving users' defined setup parameters to determine if a designated recipient has indicated that he or she desires translation of any mnemonics received in a text. The system 112 also checks if the sending user has designated that such translation be performed before sending the text. If the parameters of the recipient users and the parameters of the sending user do not indicate a request for translation, the text is sent to the designated recipient users within the chat room at 810. If either a recipient user or users or the sending user designated translation, then at 812, the text is translated. As described above, the system 112 can parse the words in the text and if any of the words exist in a mnemonics translation table, the word is replaced with the translation. The translated text is then sent to the designated recipient users in the chat room at 810.

As stated above, FIG. 12 illustrates the use of the translation feature of the system 112 for translation of test messages (SMS) that users send via the system 112. As described above for text sent within a chat room, the system 112 can optionally translate text messages sent between users. As shown in FIG. 9, at 900 a chat/IM room is created as described above. At 902, a participant or user in the chat room can send a text message (SMS) to one or more people on their cell phones or other computing devices, via the system 112. As with the previous example embodiment, at 904, the system 112 can make a determination whether all designated recipients received the text message. If all designated recipients did receive the text message, no further action by the system 112 is performed.

If one or more designated recipients did not receive the text message, at 906 the system 112 checks the sending user's defined parameters to determine if the sending user has designated that translation of any mnemonics be performed prior to sending the text message. If the parameters of the sending user do not indicate a request for translation, the text message is sent to the designated recipient user or users at 908. If the sending user designated translation, then at 910, the text message is translated as described above. The translated text message is then sent to the designated recipient user or users at 908.

The system 112 can also be configured to allow a user to receive RSS feeds via the system 112. A user can select from a list of predefined RSS feeds that can be subscribed to, such as for example, sports news, markets, celebrity news, etc. A user can also define their own RSS feed. A user can set up alerts on the RSS feeds that can be sent to the user via, for example, SMS text messaging or emails. An alert can optionally be setup based on specific keywords or other filter parameters. For example, the user can specify how often the system should pull the source of the RSS feed.

Figure 13:
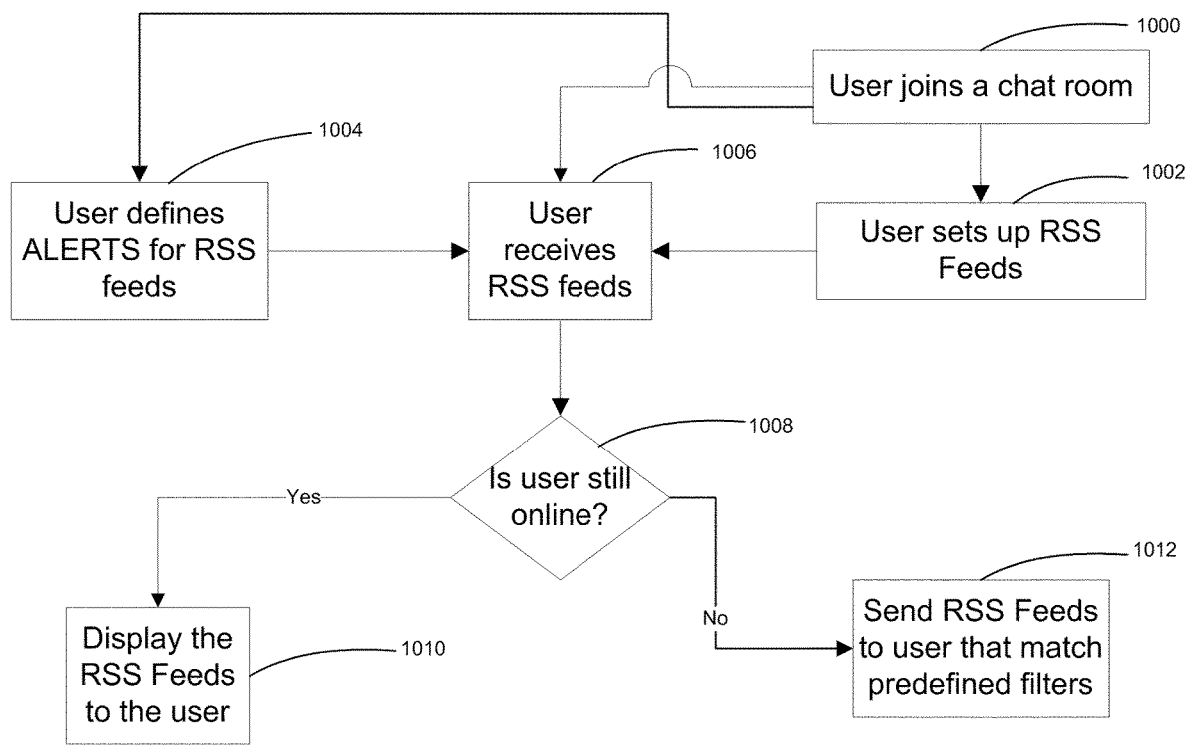
FIG. 13 is a flowchart illustrating a method of receiving RSS feeds according to an embodiment of an integrated communication system.

FIG. 13 illustrates an example of a RSS feed feature of the system 112. At 1000, a user can join a chat room as described herein. At 1002, the user can set up the system 112 to send the user RSS feeds. Optionally, the user can define alerts on the RSS feeds to be sent to the user when the user is not online with the system 112. As described above, the alerts can be based on keywords or other parameters. At 1006, the user receives selected RSS feeds via the system 112. The system 112 can also be configured to check whether the user is online at 1008. If the user is online with the system, at 1010, the system 112 displays the RSS feeds to the user. If the user is not online, at 1012, the system 112 sends an alert to the user for RSS feeds that match the pre-defined filters set up by the user.

Figure 14:
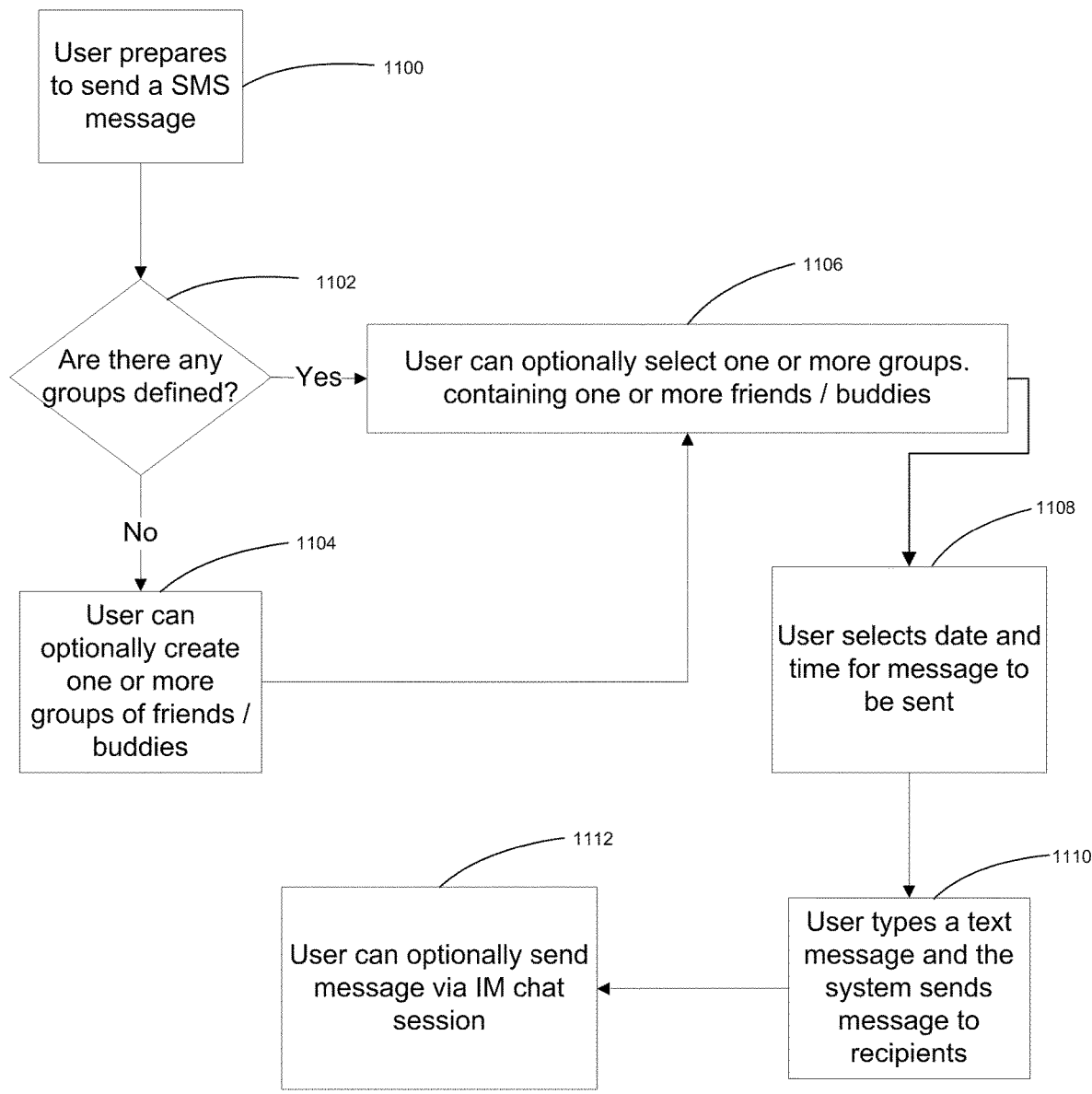
FIG. 14 is a flowchart illustrating a method of creating distribution groups and sending messages to a distribution group according to an embodiment of an integrated communication system.

FIG. 14 illustrates a method of setting up a group distribution list and sending a message to one or more groups according to an embodiment of an integrated communication system 112. This allows a user to send a message to multiple recipients without having to select each recipient individually. As shown in FIG. 14, at 1100, a user prepares to send a SMS message using the system 112. At 1102, the user can check if he or she has any predefined group distribution lists within the system 112. In some embodiments, the system 112 can automatically check for such a distribution list. For example, when a user initiates a message, the system 112 can check for any predefined group distribution lists. If there are no predefined distribution lists, the user can optionally create a distribution list at 1104. If there are existing predefined group distribution lists, the user can select one or more groups at 1106.

At 1108, the user can select a day and time for the message to be sent. For example, the user can select to send the message immediately, or can select a later day and/or time to send the message. At 1110, the user types the text message and initiates the system to send the message to the designated recipients. At 1112, the user can select to send the message via an IM chat, rather than or in addition to, via SMS.

Figure 15:
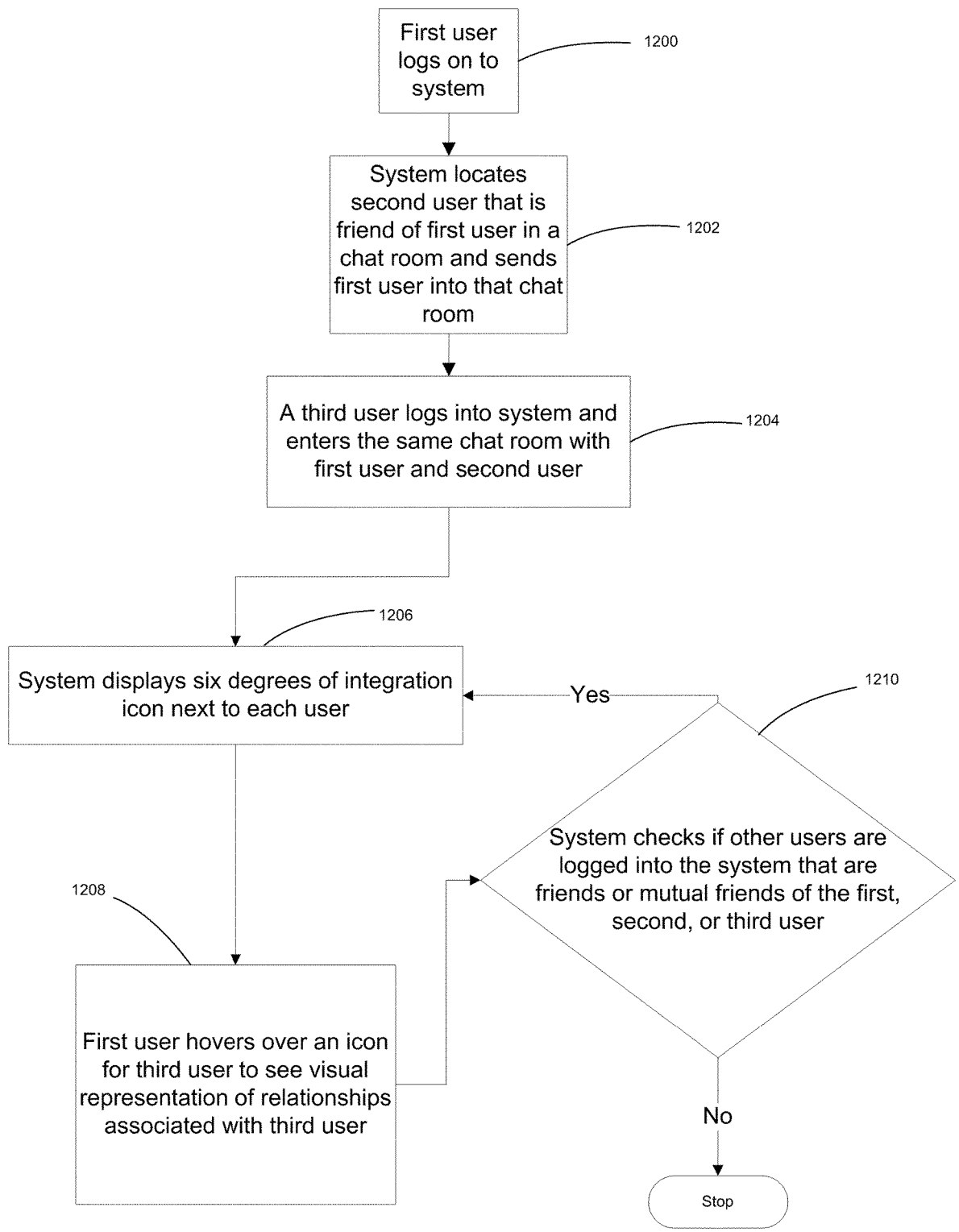
FIG. 15 is a flowchart illustrating a method of displaying relationships between users/participants within a chat room according to an embodiment of an integrated communication system.

FIG. 15 is a flowchart illustrating a method of evaluating the relationships between participants in a chat room according to an embodiment of an integrated communication system 112. At 1200, a first user logs into the system. At 1202 the system 112 identifies the first user and locates a friend or friends (referred to as second user) of the first user currently logged into a chat room and sends or logs the user into that chat room. At 1204, a third user, who can be, for example, a friend of the second user, logs into the system 112 and enters the same chat room in which the first user and the second user are currently logged in. At 1206, the system displays a six degrees of integration icon (also referred to as "integration icon") next to each user (e.g., first user, second user, third user, etc.). The integration icons allow the users/participants to view the relationships between the various users in the chat room.

At 1208, a user can hover over an icon (e.g., place the pointing arrow over the icon) next to another user's name (or other indicator of the user) and see relationships that user has with other users. For example, if the first user hovers over the icon associated with the third user, he can see if the third user is a friend of the second user and if the second user is a friend of the first user. There can be a variety of different visual representations to illustrate various relationships. For example, one visual presentation can be a tree diagram structure showing the relationships between users. In the above example, the tree diagram can show the relationship between the first user, the second user and third user. In another example, the visual representation can show all mutual friends, but only highlight a path between the first user, the second user and the third user. At 1210, the system 112 checks for other users logged into the system to determine if they are friends of the first user, the second user or the third user, in this example. If a friend of one of the users is identified, the integration icon will be displayed next to that user's name at 1206.

Figure 16:
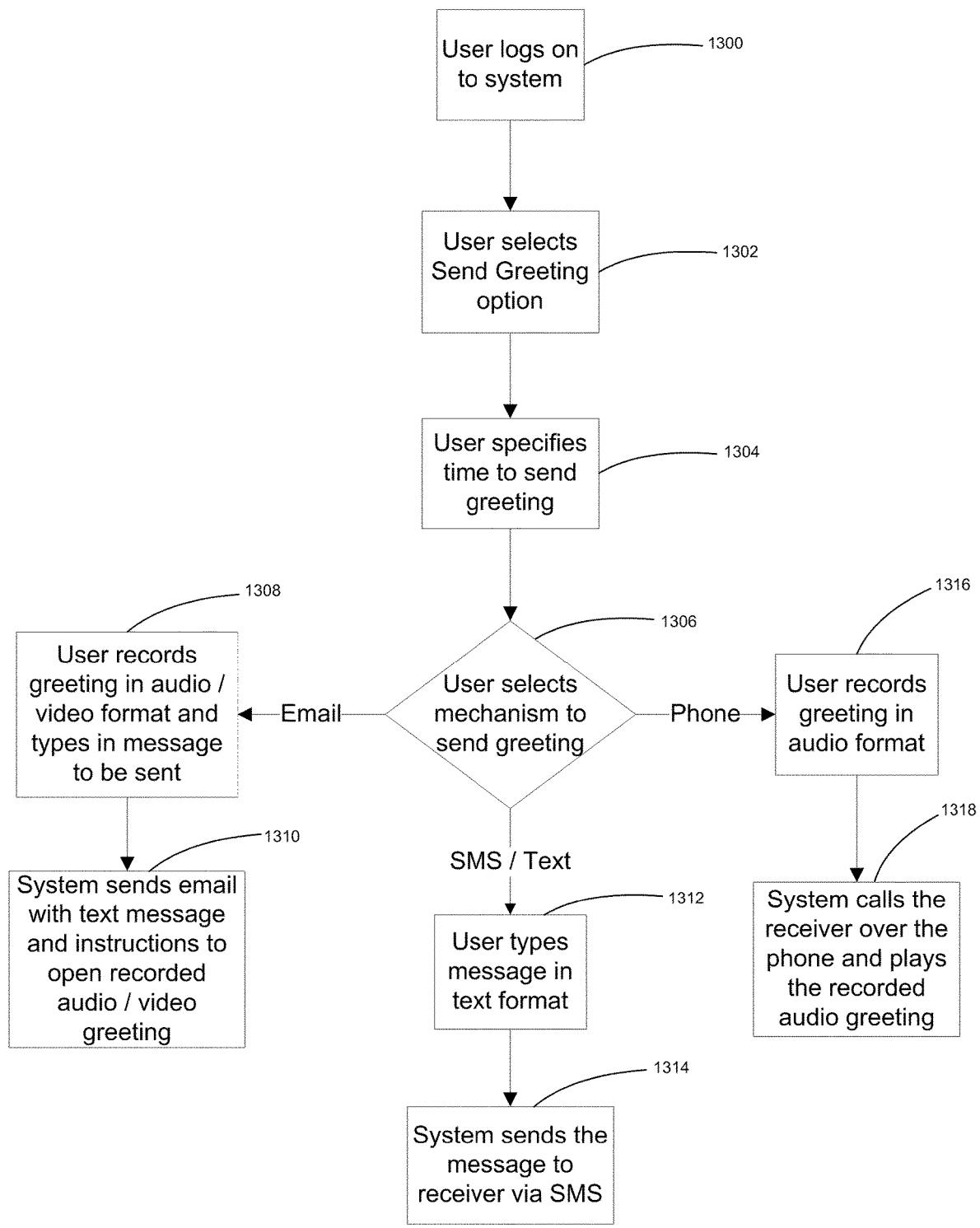
FIGS. 16 and 17 are each a flowchart illustrating a method of creating and sending a greetings and a method of creating and sending reminders, respectively, according to embodiments of an integrated communication system.
Figure 17:
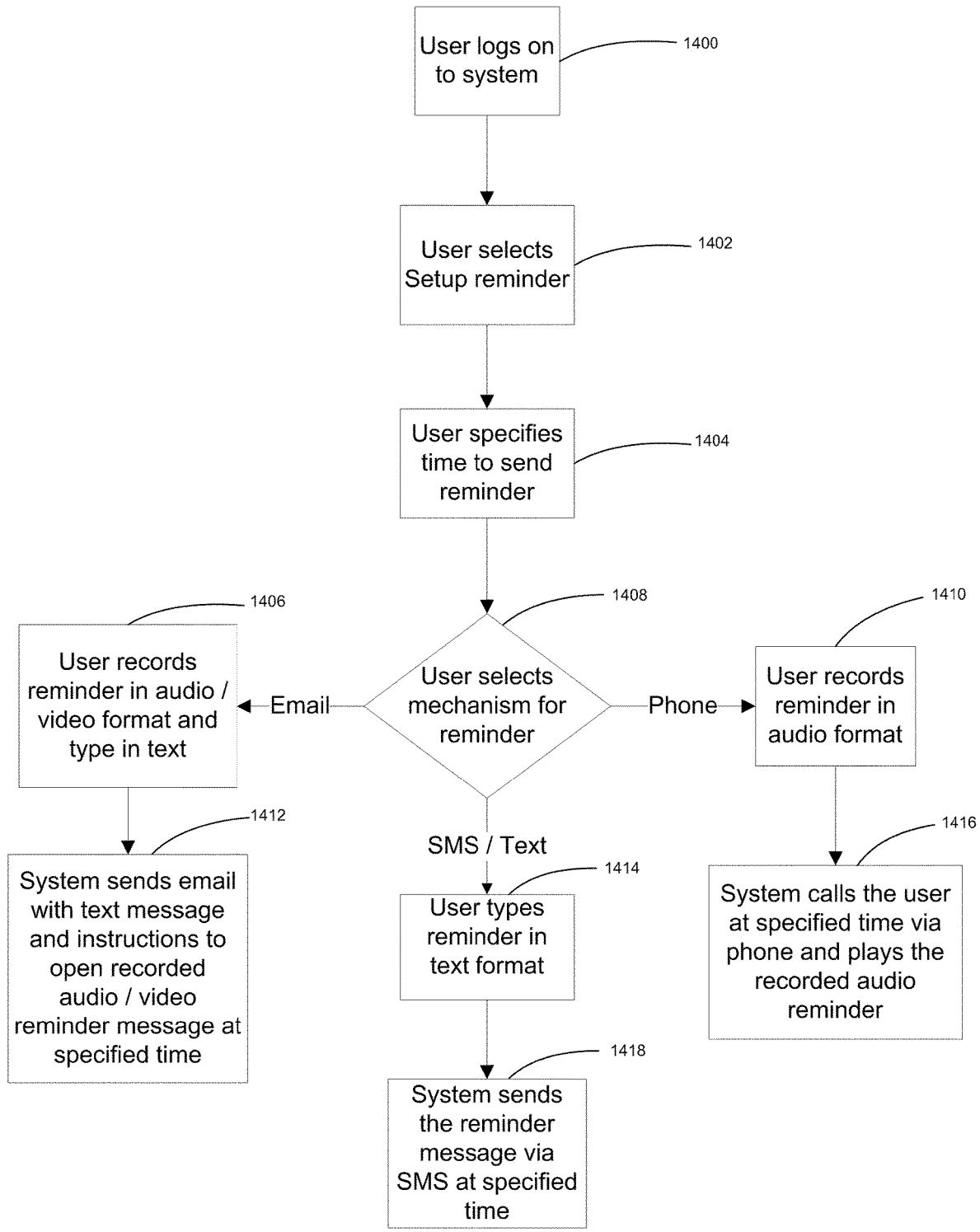

FIGS. 16 and 17 illustrate a method of sending greetings to another user or users or to a third party, and a method of sending a reminder to the user, respectively, using the system 112. The system 112 can send a greetings or reminder message via SMS, email or phone. When sending a greeting by email, the user can include an audio/video format and/or text. If sending a greeting by phone, a user can use an audio format, and to send a greeting by SMS the user can use a text format. In some embodiments, a user can also select from prerecorded audio and/or video greetings to send to other users or to a third party. In some embodiments, the user can overlay a voice message onto a prerecorded greeting or message.

As shown in FIG. 16, a user can log into the system at 1300. At 1302 the user selects the send greeting option. For example, the user can click on an icon displayed on the user interface (computer screen). At 1304, the user can specify a time to send the greeting. For example, the greeting can be sent immediately, or specify that the greeting be delivered at a later time. At 1306, the user can select a mechanism to send the greeting. For example, the user can select email, phone or SMS/text.

If the user selects email, at 1308, the user can record a greeting in audio, video and/or text format. In this scenario, at 1310, the system 112 sends the email to the intended recipient or recipients at the specified time (e.g., selected at 1304). If the greeting includes an audio/video attachment, the email can include instructions for the recipient to open the recorded audio/video greeting. In some embodiments, the system 112 can automatically include such instructions in the email. If the user, at 1306, selects to send a greeting via SMS, at 1312, the user can type a message in text format. At 1314, the system 112 sends the greeting to the intended recipient or recipients via SMS at the specified time (e.g., selected at 1304). If at 1306 the user selects to send a greeting via phone, at 1316, the user can record a greeting in audio format. At 1318, the system 112, at the specified time (e.g., selected at 1304), calls the intended recipient via VOIP and plays the recorded audio greeting.

As shown in FIG. 17, the method of sending a reminder is similar to the method of sending a greeting. In this embodiment, at 1400, a user logs into the system 112. At 1402, the user selects to set up a reminder. For example, the user can click on an icon displayed on the user interface. At 1404, the user can specify a time for delivery of the reminder (e.g., immediately or at a later selected time). The reminder can also be tied to the user's calendaring program such that the date and/or time of the reminder is displayed within the user's calendar. At 1406 the user can select a mode of delivery for the reminder. For example, the user can select to have a reminder sent to himself or another user via email, SMS, or phone.

If the user selects email, at 1408, the user can record a reminder in audio, video, and/or text format. At 1410, the system 112 sends the reminder to the user or other intended recipient at the specified time selected at 1404. If the reminder includes an audio or video format portion, the email can include instructions for the recipient to open the recorded audio or video reminder. In some embodiments, the system 112 can automatically include such instructions in the email. If the user, at 1406, selects to send a reminder via SMS, at 1412, the user can type a message in text format. At 1414, the system 112 sends the reminder to the intended recipient or recipients via SMS at the specified time (e.g., selected at 1404). If at 1406 the user selects to send a reminder via phone, at 1416, the user can record a greeting in audio format. At 1418, the system 112, at the specified time (e.g., selected at 1404), calls the intended recipient(s) via VOIP and plays the recorded audio reminder.

Figure 18:
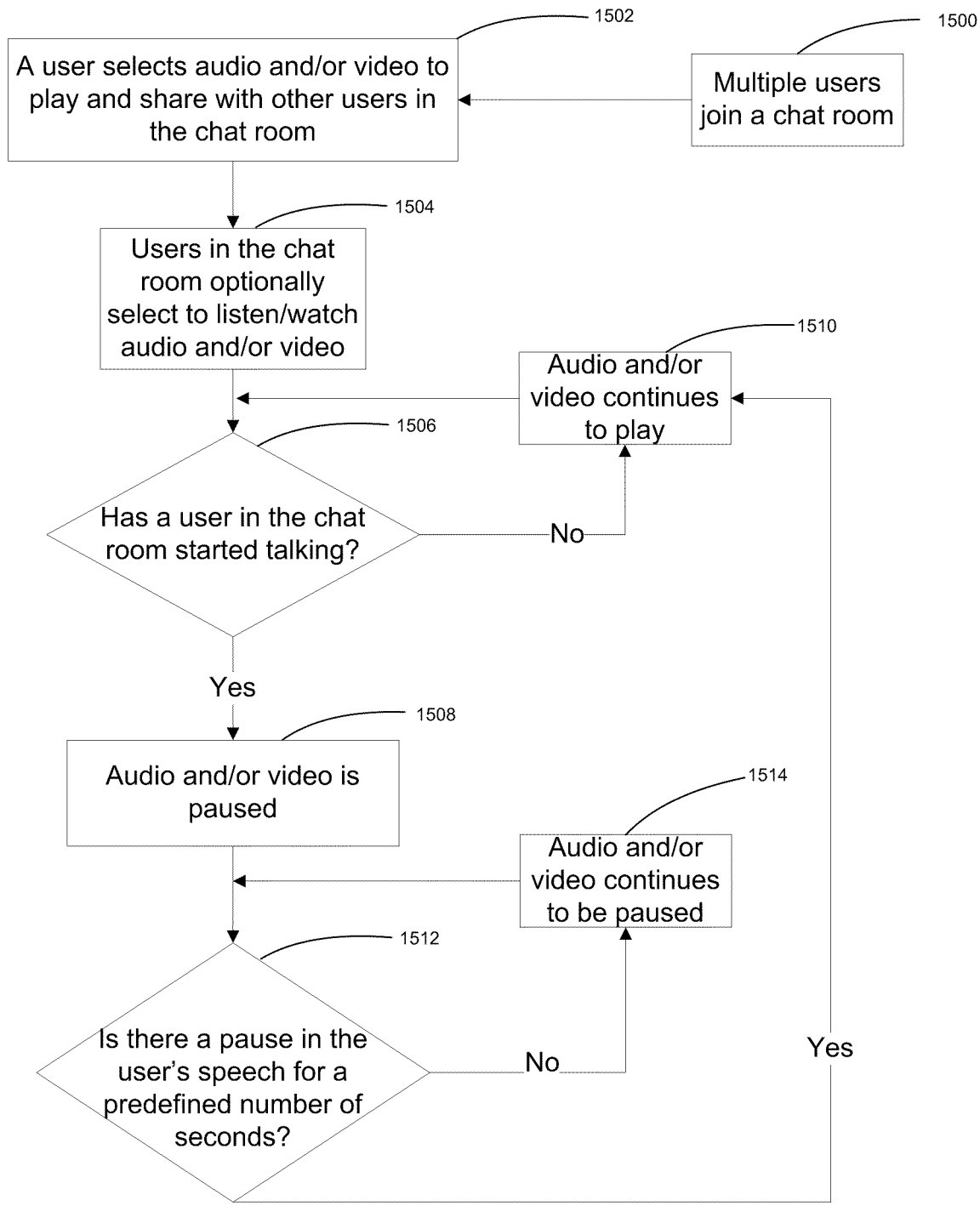
FIG. 18 is a flowchart illustrating a method of implementing a voice activated delay in an audio and/or video playing within a chat room.

FIG. 18 illustrates a feature that allows for users of the integrated communication system 112 to interrupt or pause the audio portion of a file, such as music or a video, within a chat room. For example, when multiple users are listening to an audio (e.g., music file) or video file (e.g., movie), and one of the participants wants to make a comment or otherwise break-in while the audio or video file is playing, the system 112 can automatically pause the audio portion when that user begins to speak. Thus, the system 112 provides for the voice activated pause of audio playing within a chat room as one participant in the chat room begins to speak. The system 112 can also be configured to pause both the audio and video (not just the audio portion) based on voice activation.

One example method of such a feature is described with reference to FIG. 18. At 1500, multiple users (e.g., at least two) log in to the system 112 and join a chat room as described above. At 1502, one of the users selects an audio (e.g., music) or video file to share with the other participants in the chat room. At 1504, other participants in the chat room can optionally select to listen and/or view the selected audio or video file. At 1506, as one of the participants begins to speak, the system 112 detects the user's voice and at 1508, the system 112 automatically pauses the audio or audio portion of the video (or the video and audio) to allow the other users in the chat room to hear what the participant is saying. Otherwise, the audio/video continues to play at 1510. At 1512, the system 112 can detect if there is a pause in the user's speech for a predefined number of seconds. If there is a pause in the user's speech that exceeds the predefined number of seconds, the system 112 resumes play of the audio at 1510. Otherwise, the audio/video continues to remain paused at 1514.

Figure 19A:
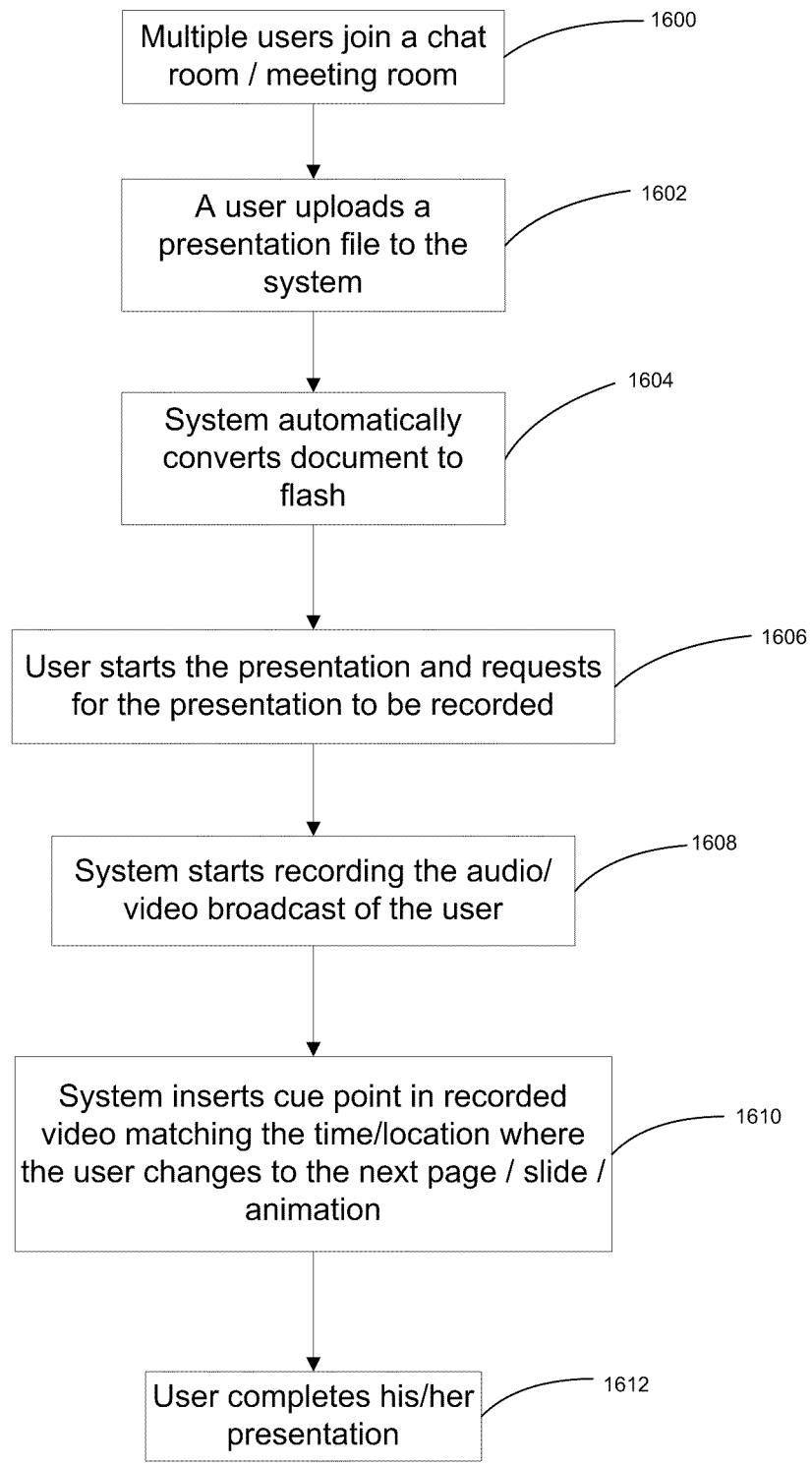
FIG. 19A illustrates a method of recording an audio and/or video of a presentation and providing a search capability of the presentation based on inserted cue points in the recording.
Figure 19B:
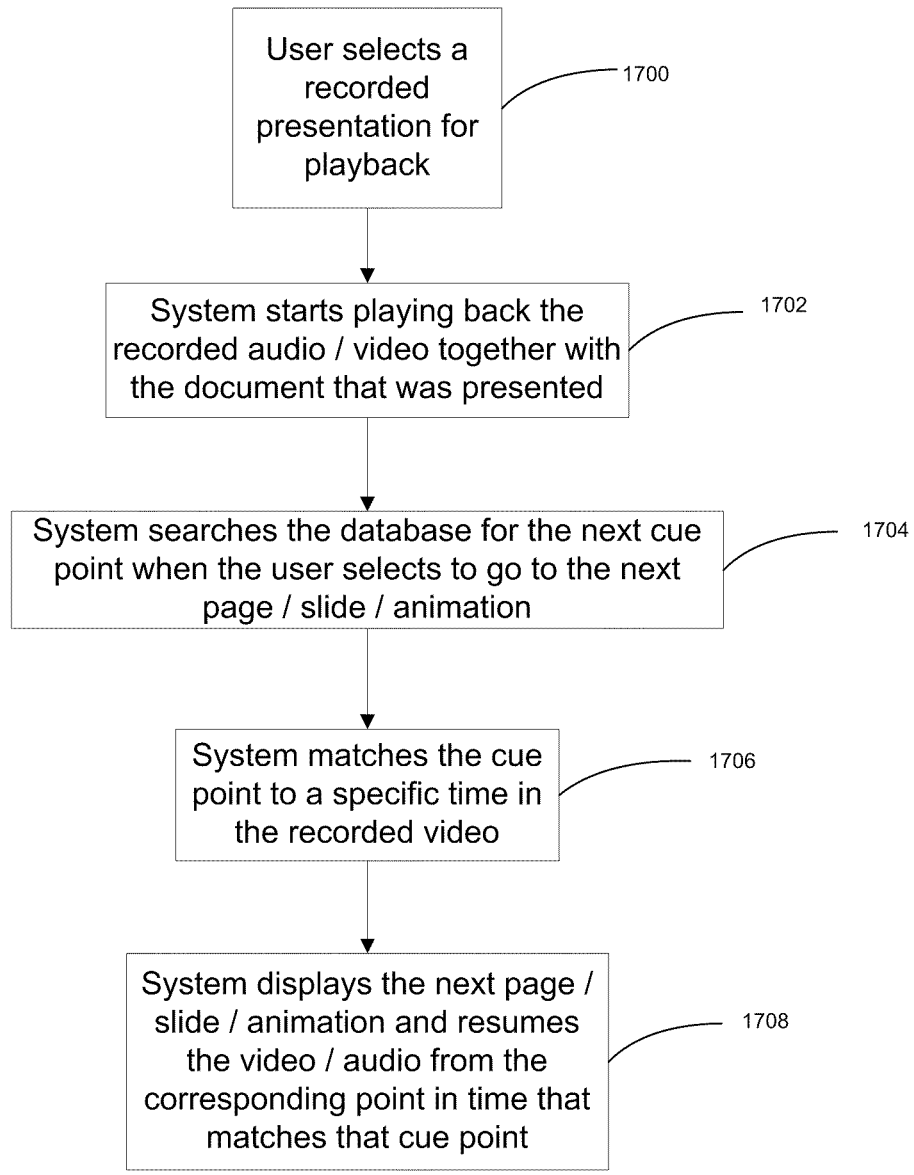
FIG. 19B illustrates a method of playing back the recorded presentation and corresponding presentation documents.

FIGS. 19A and 19B illustrate a feature of the system 112 that provides synching of video/audio to slide changes in, for example, PowerPoint presentations, using a cue point made available by Flash. This feature enables the system 112, on playback, to empower a user to jump from slide to slide or animation to animation during a presentation, and the video associated with the presentation will automatically fast forward to the desired point.

As shown in FIG. 19A, an example method includes multiple users logging on to the system 112 and joining a chat room at 1600. At 1602, a user in the chat room uploads, for example, a PowerPoint presentation (or other type of file, such as, for example, Excel, Word, Visio, PDF, etc.) to the system 112. At 1604, the system 112 automatically converts the uploaded document into Flash. All images within those files can be converted to web friendly images that include fewer bytes. The verbiage can also be extracted and loaded into a database of the system 112. This provides the user a search capability on verbiage within the user's presentation. For example, in a PowerPoint presentation, all the animations can be converted to Flash.

At 1606, the user starts the presentation and requests the system 112 to record the presentation. At 1608, upon receipt of the request, the system 112 begins recording the presentation. The recording can include audio and/or video of the user. At 1610, as the user moves to the next page/slide/animation in the presentation, the system 112 inserts a cue point into the recorded video matching the exact time this took place. This continues until the user completes the presentation at 1612.

FIG. 19B illustrates how the system 112 can playback the recorded presentation. At 1700, a user selects the recorded presentation to playback. At 1702, the system 112 starts the play back of the recorded presentation (e.g., audio and/or video) together with the document (e.g., a PowerPoint, Word, Excel, PDF file, etc.) that was presented during the presentation. At 1704, when the user selects to go to the next page/slide/animation in the presentation, the system 112 searches the database for the next cue point. At 1706, the system 112 matches that cue point to a specific time in the recorded audio and/or video. At 1708, the system 112 will display the next page/slide/animation and resumes the video/audio from the corresponding point in time that matches that cue point.

Figure 20:
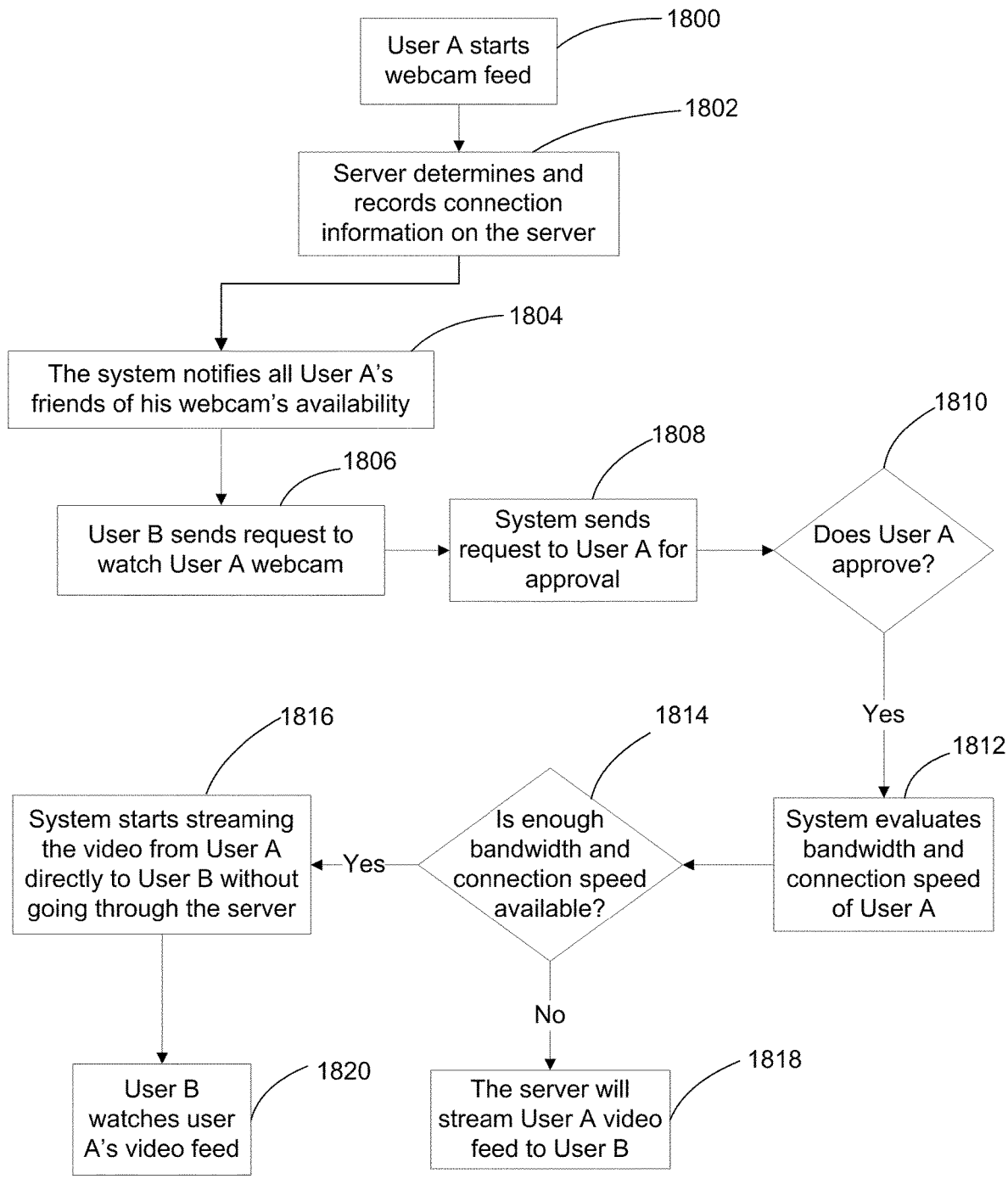
FIG. 20 is a flowchart illustrating a method of streaming video feeds between users on an integrated communication system.

FIG. 20 illustrates another feature that can be provided by the integrated communication system 112. An example method of streaming video feeds between users within a video chat room is described. Thus, the video feeds can bypass the server of the system 112, which can reduce costs.

As shown in FIG. 20, at 1800, a user A starts a webcam feed. At 1802, a server of the system 112 determines and records connection information on the server. The connection information can include, for example, connection speed. At 1804, the system 112 notifies all user A's friends of user A's webcam availability. At 1806, a user B (e.g., another user or participant in the chat room) sends a request to the system 112 to watch user A's webcam. The system 112 then sends to the request to user A for approval at 1808. At 1810, the user A can approve the request. If user A approves the request, the system 112 evaluates bandwidth and connection speeds of user A, at 1812 and at 1814, the system 112 determines if there is enough bandwidth and connection speed available at user A. If there is enough bandwidth and connection speed available, then the system 112 starts streaming the video from user A directly to user B without going through the server of the system 112 at 1816, and user B can watch user A's video feed at 1820. If there is not enough bandwidth and connection speed available at user A, then at 1818, the system 112 will stream the user A video feed to user B. In other words, if there is enough bandwidth and connection speed at the device streaming the video feed, the server at the system 112 is bypassed, but if there is not enough bandwidth and connection speed at the source device, the video feed is routed to the receiving device via the server of system 112.

The above process can be repeated for other users requesting to watch user A's video feed. Each time a user makes a request to watch the video feed the system 112 evaluates the bandwidth and connection speed to see if there is enough to stream to the new user. When a threshold is reached, the new users will be streamed through the server of the system 112, while for users already receiving the video feed the video will still be streamed directly from user A's computer.

The integrated communication system 112 described herein (also referred to herein as "system" or "communication system") can be embodied in a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signals; and hardware devices that are specially configured to store and execute program code, such as Application-Specific Integrated Circuits (ASICs), Programmable Logic Devices (PLDs), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention can be implemented using Java, C++, or other object-oriented programming language and development tools. Additional examples of computer code include, but are not limited to, control signals, encrypted code, and compressed code.

While various embodiments have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments of an integrated communications system 112 have been described as having particular features and/or combinations of features and/or components, other embodiments are possible having any combination or sub-combination of any features and/or components from any of embodiments/figures as discussed above.

What is claimed is:

1. A method, comprising:
providing an integrated communication system;
identifying social networks and instant messaging networks associated with a user on an electronic communication network;
logging the user with a first electronic device into the identified social networks and instant messaging networks associated with the user through the integrated communication system;
identifying friends of the user within the identified social networks and instant messaging networks and displaying on the first electronic device a list of the friends to the user through the integrated communication system;
determining whether one or more of the friends of the user has created a chat room in one or more of the instant messaging networks and social networks associated with the user;
upon request by the user, connecting the user with the first electronic device to the chat room through the integrated communication system; and
while the first electronic device is connected to the chatroom, streaming data from the first electronic device directly to a second electronic device connected to the chatroom bypassing a video server of the integrated communication system.

2. The method of claim 1, further comprising:
after the determining, and upon request by the user, creating a second chat room for the user in the integrated communication system configured to communicate with the social networks and instant messaging networks associated with the user.

3. The method of claim 1, the method further comprising:
connecting the user to the chat room within the electronic communication network via a voice over internet protocol call.

4. The method of claim 1, further comprising:
sending a voice over internet protocol call initiated by a first user within the chat room of the electronic communication network to a second user within the chat room or to a third party.

5. The method of claim 1, further comprising:
sending a text message created by a first user within the chat room of the electronic communication network to a second user of the chat room or to a third party.

6. The method of claim 1, further comprising:
displaying a list of participants within the chat room of the electronic communication network; and
providing relationship information associated with each participant within the chat room.

7. The method of claim 1, further comprising:
displaying within the chat room of the electronic communication network a video feed of a first user in a larger format than a video feed associated with each of the remaining users when the first user is communicating with the other users via audio or text communications.

8. The method of claim 1, further comprising:
translating a mnemonic included within a text message sent by a user of the chat room of the electronic communication network.

9. The method of claim 1, further comprising:
encoding the audio output at the electronic device to distribute the audio for each participant within the chat room to a selected speaker from a plurality of speakers coupled to the electronic device.

10. The method of claim 1, further comprising:
automatically pausing an audio output of an audio or video file playing within the chat room upon voice recognition of a participant in the chat room.

11. The method of claim 1, further comprising:
during a presentation, inserting a cue point into a recorded video of the presentation to indicate a time and a location within the video where a page of the presentation transitions from one page to another page.

12. The method of claim 1, wherein streaming data comprises streaming a video feed.

13. A method, comprising:
sending from an electronic device to an integrated communication system information associated with a user's identification and password associated with one or more instant messaging networks or social networks;
receiving at the electronic device a list of preselected friends associated with the instant messaging networks and social networks associated with the user;
receiving at the electronic device a list of chat rooms initiated by one or more of the preselected friends, the list of chat rooms including at least one chat room;
selecting to join a chat room from the at least one chat room listed;
joining the chat room from the integrated communication system to connect the integrated communication system and the electronic device with the chat room from one or more instant messaging networks or social networks other than the integrated communication system; and
while the electronic device is connected to the chat room, streaming data from the electronic device directly to another electronic device connected to the chat room bypassing a video server of the integrated communication system.

14. The method of claim 13, further comprising:
sending a request from the electronic device to the integrated communication system to create a second chat room.

15. The method of claim 13, further comprising:
receiving a list of participants within the chat room and an indication of the social networks associated with each participant; and
receiving relationship information associated with each participant within the chat room.

16. The method of claim 13, further comprising:
receiving at the electronic device a RSS feed from the integrated communication system.

17. The method of claim 13, further comprising:
sending from the electronic device a text message created by a participant in the chat room to another participant in the chat room.

18. The method of claim 13, further comprising:
sending from the electronic device a greeting to at least one of a participant in the chat room or a third party.

19. The method of claim 13, further comprising:
sending from the electronic device a reminder to the user of the electronic device, the reminder being displayed at a specified time and date within the user's calendar program.

20. An integrated communications system, comprising:
a user interface generated by at least one of one or more processors and presented to a first user at a first user device, the user interface configured to receive login credentials for a plurality of social networks, messaging systems, and combinations thereof;
a server including at least one of one or more processors configured to execute non-transitory machine readable instructions stored in physical memory that, when executed, performs the process of:
connecting the first user device to a plurality of social networks, messaging systems, and combinations thereof,
creating a chat room and connecting the first user device to the chat room,
connecting a second user device to the chat room through a first social network or messaging system,
connecting a third user device to the chat room through a second social network or messaging system different from that of the first social network or messaging system, and
integrating communications within the chat room created by the server between the first user device, the second user device, and the third user device and across the plurality of social networks, messaging systems, and combinations thereof such that information received from any of the first user device, the second user device, and the third user device is shared among all of the first user device, the second user device, and the third user device; and
while the first user device, the second user device, and the third user device are connected to the chatroom, streaming data from the first user device directly to the second user device or the third user device bypassing a video server of the integrated communication system.

* * * * *